United States Patent
Kukita et al.

(10) Patent No.: US 11,379,109 B2
(45) Date of Patent: Jul. 5, 2022

(54) SETTING VALUE CHANGE DEVICE

(71) Applicant: DAIKIN INDUSTRIES, LTD., Osaka (JP)

(72) Inventors: Tomomi Kukita, Osaka (JP); Hiroko Kashimoto, Osaka (JP); Hiroyasu Kosuge, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 222 days.

(21) Appl. No.: 16/014,914

(22) Filed: Jun. 21, 2018

(65) Prior Publication Data

US 2018/0314403 A1 Nov. 1, 2018

Related U.S. Application Data

(63) Continuation of application No. PCT/JP2016/087839, filed on Dec. 19, 2016.

(30) Foreign Application Priority Data

Dec. 22, 2015 (JP) .............................. JP2015-249748

(51) Int. Cl.
*G06F 3/0486* (2013.01)
*G06F 3/04883* (2022.01)
(Continued)

(52) U.S. Cl.
CPC ............. *G06F 3/0486* (2013.01); *F24D 5/00* (2013.01); *F24D 5/12* (2013.01); *F24F 11/00* (2013.01);
(Continued)

(58) Field of Classification Search
CPC ..... F24D 5/00; F24D 5/12; F24F 11/00; F24F 11/89; F24H 1/00; F24H 1/18;
(Continued)

(56) References Cited

U.S. PATENT DOCUMENTS

| 5,973,676 A | 10/1999 | Kawakura |
| 2008/0165160 A1* | 7/2008 | Kocienda .......... H04M 1/72403 345/175 |

(Continued)

FOREIGN PATENT DOCUMENTS

| JP | 2015-513747 A | 5/2015 |
| JP | 2015-114057 A | 6/2015 |
| WO | WO 2013/133893 A1 | 9/2013 |

OTHER PUBLICATIONS

International Search Report issued in PCT/JP2016/087839 (PCT/ISA/210), dated Feb. 28, 2017.

(Continued)

*Primary Examiner* — Jennifer N Welch
*Assistant Examiner* — Reji Kartholy
(74) *Attorney, Agent, or Firm* — Birch, Stewart, Kolasch & Birch, LLP

(57) ABSTRACT

A setting value change device is provided whereby change operations to correct temperature setting values or hot water amount values by drag operations are easy. A controller causes a display to display a drag button and a movement path on which the drag button moves. Additionally, the controller provides, on a touch sensor, a drag area for detecting a drag input on the drag button and a reference point disposed at a location off the movement path. Moreover, the controller is configured to set the drag area larger than the display range of the movement path, move the drag button to a crossing point where a straight line or specific curve connecting the reference point to a drag operation position in the drag area crosses the movement path, and change the temperature setting value to the value corresponding to the position of the drag button.

20 Claims, 19 Drawing Sheets

(51) Int. Cl.
    *G06F 3/0488*     (2022.01)
    *G06F 3/04847*     (2022.01)
    *F24H 1/18*     (2022.01)
    *F24H 1/00*     (2022.01)
    *F24D 5/00*     (2022.01)
    *F24F 11/89*     (2018.01)
    *F24D 5/12*     (2006.01)
    *F24F 11/00*     (2018.01)

(52) U.S. Cl.
    CPC ............... *F24F 11/89* (2018.01); *F24H 1/00* (2013.01); *F24H 1/18* (2013.01); *G06F 3/0488* (2013.01); *G06F 3/04847* (2013.01); *G06F 3/04883* (2013.01); *Y02B 30/13* (2018.05)

(58) Field of Classification Search
    CPC .. G06F 3/04847; G06F 3/0486; G06F 3/0488; G06F 3/04883; Y02B 30/13
    See application file for complete search history.

(56) References Cited

U.S. PATENT DOCUMENTS

| | | | |
|---|---|---|---|
| 2009/0058830 A1* | 3/2009 | Herz | G06F 3/0488 345/173 |
| 2013/0019204 A1 | 1/2013 | Kotler et al. | |
| 2013/0093709 A1* | 4/2013 | Fujibayashi | G06F 3/0488 345/173 |
| 2013/0100042 A1 | 4/2013 | Kincaid | |
| 2013/0100060 A1* | 4/2013 | Iwaizumi | G06F 3/04842 345/173 |
| 2014/0245226 A1 | 8/2014 | Butscher et al. | |
| 2014/0319232 A1* | 10/2014 | Gourlay | G06F 3/04886 236/51 |
| 2015/0145784 A1* | 5/2015 | Dowd | G06F 3/04883 345/173 |
| 2015/0370473 A1* | 12/2015 | Chen | G06F 3/04886 345/174 |
| 2016/0010889 A1* | 1/2016 | Hashimoto | F24F 11/30 700/276 |
| 2016/0306538 A1 | 10/2016 | Yamamoto | |
| 2017/0017384 A1* | 1/2017 | Lee | G06F 3/04883 |
| 2017/0329507 A1 | 11/2017 | Yamamoto | |

OTHER PUBLICATIONS

Microsoft, "Illustration of slider based parameter interactions in the Windows XP mediaplayer (series of screenshoot)", Windows XP, Jan. 1, 2007, XP055697289, 5 pages.
Stack Exchange User Simon:, "Why do scrollbars revert to original scroll distance when mouse is dragged sideways too far?", User Experience Stack Exchange, Apr. 12, 2014, XP055697322, 4 pages.
Extended European Search Report dated May 12, 2021 in corresponding European Application No. 21167373.6.

* cited by examiner

| CONTENT OF FUNCTION | CODE | 0: PRESENCE, 1: ABSENCE |
|---|---|---|
| CUMULATIVE OPERATING TIME MEASUREMENT FUNCTION | XX1 | 0 |
| POWER CONSUMPTION MEASUREMENT FUNCTION | XX2 | 0 |
| LAUNDRY DRYING OPERATION FUNCTION | XX3 | 1 |
| PERSON DETECTION FUNCTION | XX4 | 1 |
| ..... | ..... | ..... |
| REMOTE CONTROL WIND DIRECTION CHANGE FUNCTION | XXX | 1 |

FIG. 4

SETTING VALUE CHANGE DEVICE

TECHNICAL FIELD

The present invention relates to a setting value change device for changing a desired temperature of a refrigeration apparatus and/or a heating apparatus or a desired hot water amount of a hot water supply device.

BACKGROUND ART

In the related art, there are setting value change devices for changing desired temperature s of refrigeration apparatuses such as heat pump systems or desired hot water amounts of hot water supply devices. Examples thereof include a remote control device of a heat pump system, and smartphones and tablet computers that connect to the heat pump system via communication means described in Patent Document 1 (Japanese Unexamined Patent Application Publication No. 2015-114057). Some of these setting value change devices include a touchscreen device having both display and touch sensor functions, and it is possible to change the desired temperature using the touchscreen device. With the remote control device described in Patent Document 1, the set temperature is changed mainly using tap input or toggle input, in which touch keys are pressed. However, when using tap input or toggle input, the change in the set temperature must be recognized as a numerical value and it is difficult to intuitively ascertain increases and decreases from bodily movement. As such, as described in Patent Document 2 (Japanese Unexamined Patent Application Publication (Translation of PCT Application) No. 2015-513747), change operations of desired temperatures have been proposed in which drag input is used.

SUMMARY

However, with methods utilizing touch operation in which the dragged drag button never deviates from the position touched by the finger, a user must carefully trace the movable path of the drag button. Consequently, input is burdensome. Moreover, erroneous input occurs in cases where the finger of the user traces a trajectory deviating from the movable path.

An object of the present invention is to provide a setting value change device that facilitates change operations to correct temperature setting values or hot water amount setting values by drag operations.

A setting value change device according to a first aspect of the present invention performs change processing to change a temperature setting value of a refrigeration apparatus and/or a heating apparatus. The setting value change device includes a display that displays the temperature setting value; a touch sensor that detects a touch operation on the display, the touch sensor arranged and configured to transmit a display on the display; and a controller connected to the display and the touch sensor. The controller is configured to cause the display to display a drag button and a movement path on which the drag button moves; provide, on the touch sensor, a drag area that detects a drag input on the drag button and a reference point disposed at a location off the movement path; set the drag area larger than a display range of the movement path; and move the drag button to a crossing point where a straight line or a specific curve connecting the reference point to a drag operation position in the drag area crosses the movement path, and change the temperature setting value to a value corresponding to a position of the drag button.

With the setting value change device of the first aspect, the controller is configured to set the drag area larger than the display range of the movement path, move the drag button to the crossing point where the straight line or specific curve connecting the reference point to the drag operation position in the drag area crosses the movement path, and change the temperature setting value to the value corresponding to the position of the drag button. As such, even when a user performs rough operations resulting in the drag operation position deviating from the movement path, the drag operation can be continued and the drag button can be moved along the movement path.

A setting value change device according to a second aspect of the present invention is the setting value change device according to the first aspect, wherein the controller causes the display to display an operation button near the movement path; performs settings to enable the touch sensor to detect and input a touch operation on the operation button; and, when the drag button is being dragged, expands the drag area up to a range in which the operation button is displayed so that a change operation of the temperature setting value is continued even if there is a touch operation on the operation button.

With the setting value change device of the second aspect, when the drag button is being dragged, the drag area is expanded up to the range in which the operation button is displayed so that the change operation of the temperature setting value is continued even if there is a touch operation on the operation button. As such, a wide drag area can be obtained even when the operation button is set, and erroneous input caused by touch operations of the operation button can be reduced. As a result, drag operations are facilitated and it is easier to perform correct change operations of the temperature setting value.

A setting value change device according to a third aspect of the present invention is the setting value change device according to the first or second aspect, wherein the controller sets a cancel area such that when the cancel area is touched at a time of the drag operation of the drag button, the controller does not continue changing of the temperature setting value.

With the setting value change device of the third aspect, the change processing of the temperature setting value is not continued when the cancel area is touched during the drag operation of the drag button, and the temperature setting is completed at the timing. As such, changes to unintended temperature setting values resulting from drag operations to points beyond the end of the cancel area are eliminated.

A setting value change device according to a fourth aspect of the present invention is the setting value change device according to the third aspect, wherein the controller causes the display to display the movement path as a non-linear shape; associates a value from when a position of the drag button is at a one end of the movement path with a lower limit value of the temperature setting value; associates a value from when the position of the drag button is at the other end of the movement path with an upper limit value of the temperature setting value; and sets the cancel area to a range connecting a periphery of the one end of the movement path to a periphery of the other end of the movement path.

With the setting value change device of the fourth aspect, the cancel area is set to the range connecting the periphery of the one end of the movement path to the periphery of the other end of the movement path. As such, a misoperation in which a value near the lower limit value is inputted due to a finger moving to a location for inputting a value near the lower limit value can be reduced when the input is ended intending to input a value near the upper limit value and, also, a misoperation in which a value near the upper limit value is inputted due to a finger moving to a location for inputting a value near the upper limit value can be reduced when the input is ended intending to input a value near the lower limit value.

A setting value change device according to a fifth aspect of the present invention is the setting value change device according to the fourth aspect, wherein the controller disposes the cancel area so as to cross the straight line connecting the one end of the movement path to the other end of the movement path.

With the setting value change device of the fifth aspect, when there is a significant difference between the desired temperature and the actual set temperature, there is a high probability of the drag operation being incorrectly performed on or near the straight line connecting the one end of the movement path to the other end of the movement path. As such, the cancel area is provided so as to cross the straight line connecting the one end to the other end, and this configuration results in a high probability of reducing misoperations such as changing to a value near the lower limit value when intending to change to a value near the upper limit value and changing to a value near the upper limit value when intending to change to a value near the lower limit value.

A setting value change device according to a sixth aspect of the present invention is the setting value change device according to the fourth or fifth aspect, wherein the controller causes the display to display the movement path as a circular arc shape or an elliptical arc shape; and disposes the cancel area at a position surrounded by the movement path.

With the setting value change device of the sixth aspect, when moving the drag button along the movement path that is formed in the circular arc shape or the elliptical arc shape, there are cases where the drag operation is ended while moving the drag operation position toward the inside of the arc. The cancel area is disposed at the position surrounded by the movement path. As a result, misoperations such as changing to a value near the lower limit value when intending to change to a value near the upper limit value and changing to value near the upper limit value when intending to change to a value near the lower limit value can be reduced by the cancel area that is disposed at the position inside the arc surrounded by the circular arc-shaped or elliptical arc-shaped movement path.

A setting value change device according to a seventh aspect of the present invention is the setting value change device according to any one of the fourth to sixth aspects, wherein the controller disposes the cancel area in a range including a line segment connecting the middle of the one end of the movement path and the other end of the movement path to the reference point.

With the setting value change device of the seventh aspect, the cancel area is disposed in the range including the line segment connecting the middle of the one end of the movement path and the other end of the movement path to the reference point. As such, drag input resulting from a drag operation traversing the line segment can be reduced, and misoperations such as changing to the lower limit value when intending to change to the upper limit value and changing to the upper limit value when intending to change to the lower limit value can be reduced by the cancel area that is disposed on the line segment.

A setting value change device according to an eighth aspect of the present invention is the setting value change device according to the seventh aspect, wherein the controller sets a shape of the cancel area such that a length in a direction along the line segment is longer than a length in a direction connecting the one end to the other end.

With the setting value change device of the eighth aspect, the shape of the cancel area is set such that the length in the direction along the line segment is longer than the length in the direction connecting the one end to the other end. As such, it is possible to reduce misoperations in which, during a drag operation, the cancel area is unintentionally touched when intending to set to a value near the lower limit value or to a value near the upper limit value and the setting is not successfully completed.

A setting value change device according to a ninth aspect of the present invention is the setting value change device according to any one of the first to eighth aspects wherein, prior to the drag button being touched, the controller sets the drag area to a range smaller than the display range of the movement path including the display range of the drag button; and, after the drag operation of the drag button has started, the controller expands the drag area to set the drag area larger than the display range of the movement path.

With the setting value change device of the ninth aspect, after the drag operation of the drag button has started, the controller expands the drag area to set the drag area larger than the display range of the movement path. As such, it is possible the dispose the operation button, for example, in the drag area of the expanded portion before and after the performance of the drag operation, thereby making the performance of operations other than the drag operation easier.

A setting value change device according to a tenth aspect of the present invention performs change processing to change a hot water amount setting value of a hot water supply device. The setting value change device includes a display that displays the hot water amount setting value; a touch sensor that detects a touch operation on the display, the touch sensor arranged and configured to transmit a display on the display; and a controller connected to the display and the touch sensor. The controller is configured to cause the display to display a drag button and a movement path on which the drag button moves; provide a drag area that detects a drag input on the drag button and a reference point disposed at a location off the movement path; set the drag area larger than the display range of the movement path; and move the drag button to a crossing point where a straight line or a specific curve connecting the reference point to a drag operation position in the drag area crosses the movement path, and change the hot water amount setting value to a value corresponding to a position of the drag button.

With the setting value change device of the tenth aspect, the controller is configured to set the drag area larger than the display range of the movement path, move the drag button to the crossing point where the straight line or specific curve connecting the reference point to the drag operation position in the drag area crosses the movement path, and change the hot water amount setting value to the value corresponding to the position of the drag button. As such, even when a user performs rough operations resulting in the drag operation position deviating from the movement path, the drag operation can be continued and the drag button can be moved along the movement path and it is easier to perform change operations to correct hot water amount setting value.

With the setting value change device according to the first aspect of the present invention, change operations to correct temperature setting values by drag operation are facilitated.

With the setting value change device according to the second aspect, drag operations are easier to perform and, also, correct change operations to temperature setting values are facilitated.

With the setting value change device according to the third aspect, changes to unintended temperature setting values are reduced and, as a result, the risk of causing a user discomfort is mitigated.

With the setting value change device according to the fourth aspect, it is possible to mitigate the risk of a significant temperature difference occurring between the set temperature and the temperature intended to be set due to mistakenly inputting a value near the lower limit value instead of a value near the upper limit value of the temperature setting value, or mistakenly inputting a value near the upper limit value instead of a value near the lower limit value of the temperature setting value.

With the setting value change device according to the fifth aspect, the feature for reducing the significant temperature difference from occurring between the set temperature and the temperature intended to be set is enhanced.

With the setting value change device according to the sixth aspect, when the movement path is the circular arc shape or the elliptical arc shape, the feature for reducing the significant temperature difference from occurring between the set temperature and the temperature intended to be set is significantly enhanced.

With the setting value change device according to the seventh aspect, the feature for reducing a significant temperature difference from occurring between the set temperature and the temperature intended to be set is significantly enhanced.

With the setting value change device according to the eighth aspect, it is possible to reduce misoperations such as the unintentional input of a value near the upper limit value and the unintentional input of a value near the lower limit value.

With the setting value change device according to the ninth aspect, operability can be enhanced.

With the setting value change device according to the tenth aspect, change operations to correct hot water amount setting values by touch operation are facilitated.

BRIEF DESCRIPTION OF THE DRAWINGS

FIG. 4 is a drawing illustrating the content of possessed function information of the air conditioner;

DESCRIPTION OF EMBODIMENTS

Figure 1:
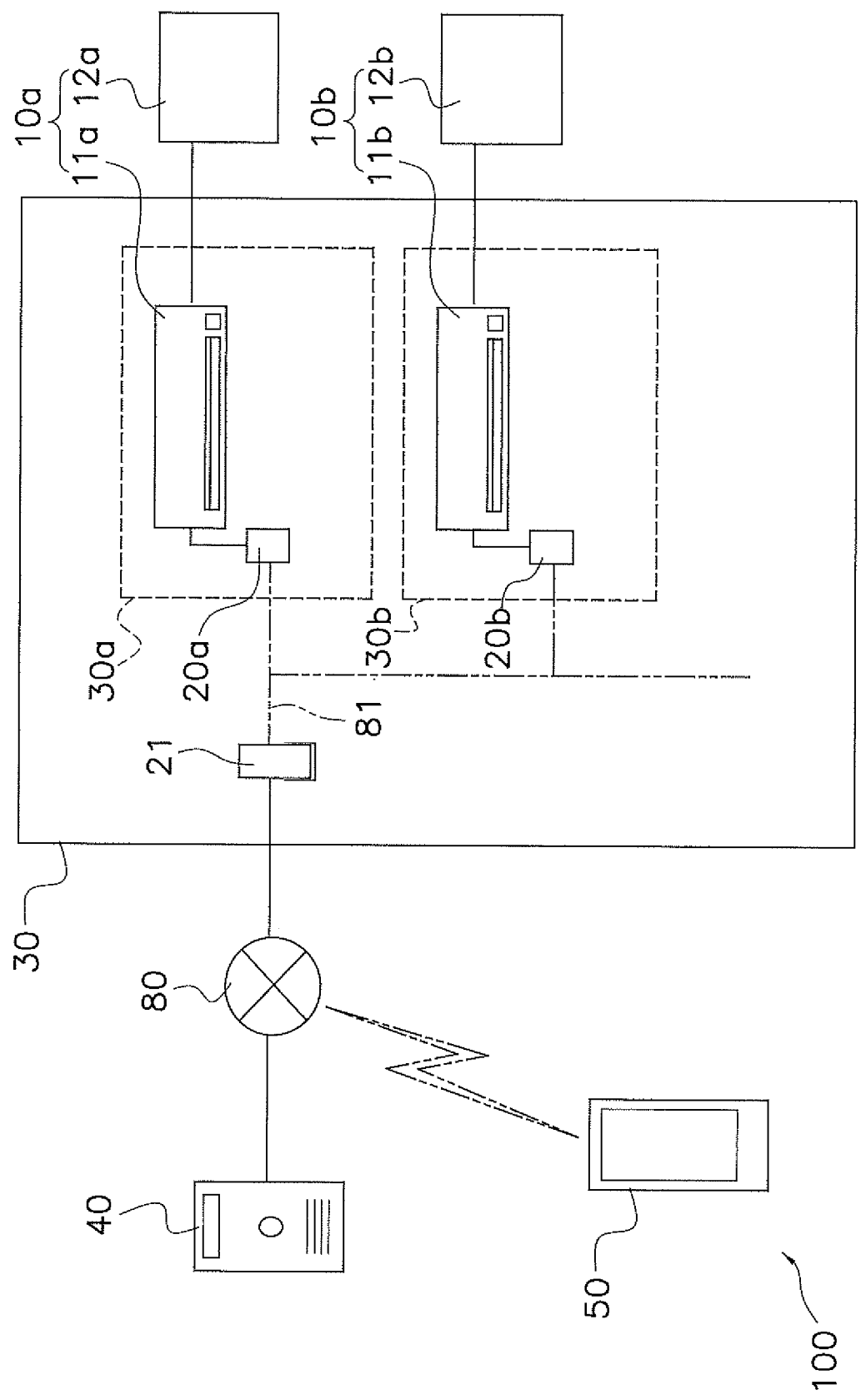
FIG. 1 is a conceptual diagram illustrating a schematic configuration of an air conditioning system according to an embodiment of the present invention.
Figure 3:
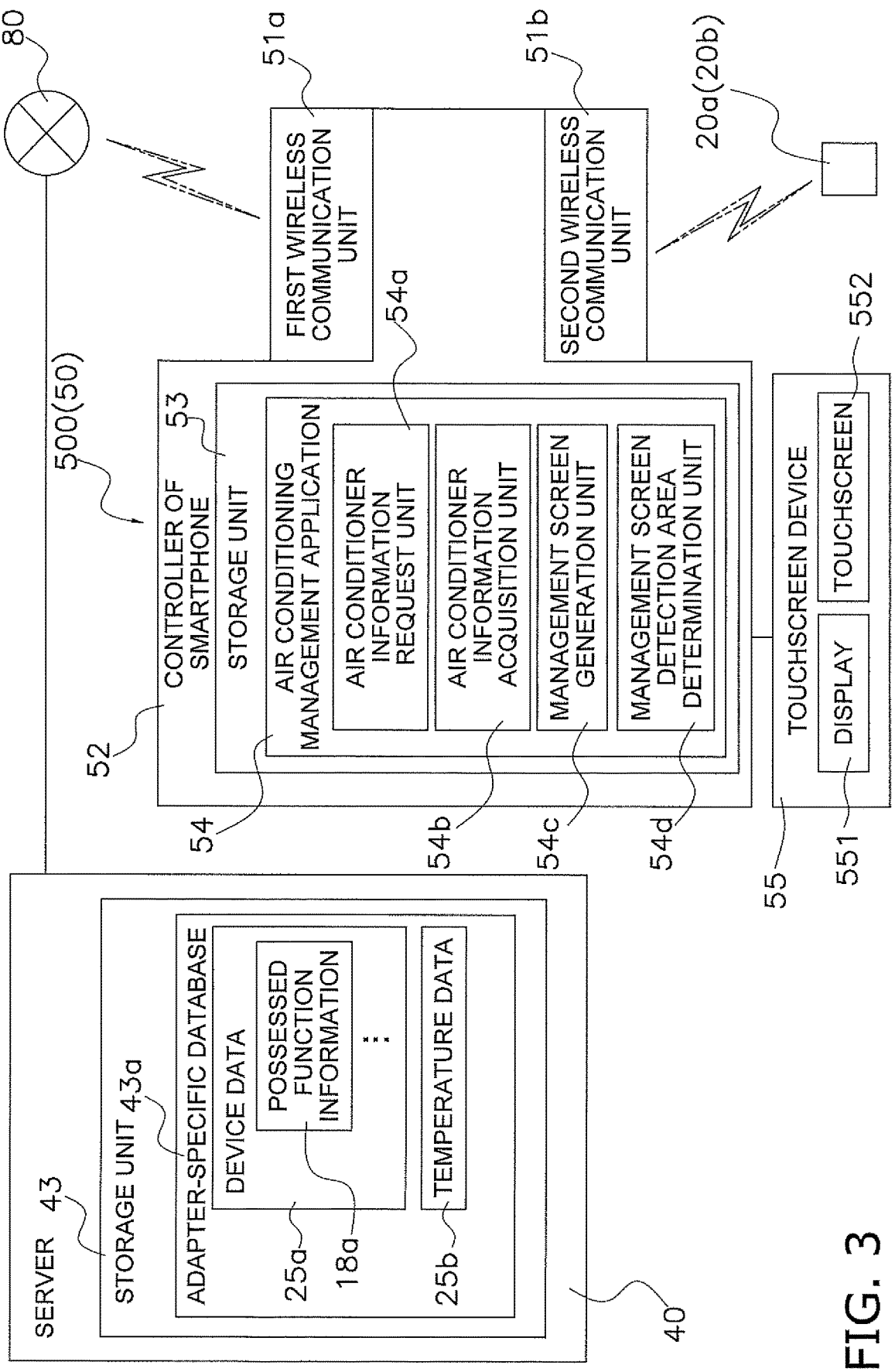
FIG. 3 is a block diagram that explains the configurations of a server and a controller of a smartphone.

Hereinafter, a description is given of a case in which a mobile terminal, specifically a smartphone, is used as an example of a setting value change device. As illustrated in FIG. 1, an air conditioning system 100 according to an embodiment of the present invention includes a mobile terminal 50. As illustrated in FIG. 3, the mobile terminal 50 specifically is a smartphone 500.

(1) Schematic Configuration of Air Conditioning System

FIG. 1 illustrates the overall configuration of the air conditioning system 100. The air conditioning system 100 is a system for acquiring information of desired air conditioners 10a and 10b from the mobile terminal 50 possessed by a user and operating the desired air conditioners 10a and 10b, via a server 40 and adapters 20a and 20b that function as information mediation devices.

A router 21 is installed in a building 30. The router 21 connects a local area network (hereinafter referred to as a "LAN") 81 installed in the building 30 to a public line 80 including the Internet. The LAN 81 is a wireless LAN that uses the functions of the router 21. The adapters 20a and 20b that are connected by wires to the air conditioners 10a and 10b are connected wirelessly to the LAN 81. In addition to the adapters 20a and 20b, network devices such as personal computers and printers (not illustrated in the drawings) used in the building 30 may also be connected to the LAN 81.

In order to manage the air conditioners 10a and 10b across the server 40 using the mobile terminal 50, each of the air conditioners 10a and 10b must be registered in advance in the server 40. To facilitate comprehension, only one building 30 is illustrated in FIG. 1. However, an actual air conditioning system 100 includes the air conditioners 10a and 10b scattered throughout a plurality of buildings 30. Specifically, the server 40 installed remotely from the building 30 is operated, via the public line 80, by a manufacturer, sales company, or maintenance company of air conditioners, and information of the air conditioners in multiple buildings 30 is accumulated in the server 40. Note that the two air conditioners 10a and 10b and the two adapters 20a and 20b are an installation example of the air conditioners and adapters installed in the building 30, and configurations are possible in which one air conditioner or three or more air conditioners are provided and/or one adapter or three or more adapters are provided.

(2) Detailed Configuration of Air Conditioning System (2-1) Air Conditioners

As illustrated in FIG. 1, the air conditioners 10a and 10b are include indoor units 11a and 11b and outdoor units 12a and 12b. The indoor units 11a and 11b are installed in rooms 30a and 30b of the building 30. The outdoor units 12a and 12b are installed outside the building 30. In addition, the indoor units 11a and 11b are connected on a one-to-one basis to the adapters 20a and 20b (described later). The air conditioner 10a and the air conditioner 10b have the same fundamental configuration and, as such, the air conditioner 10a is used as an example in the following description.

Figure 2:
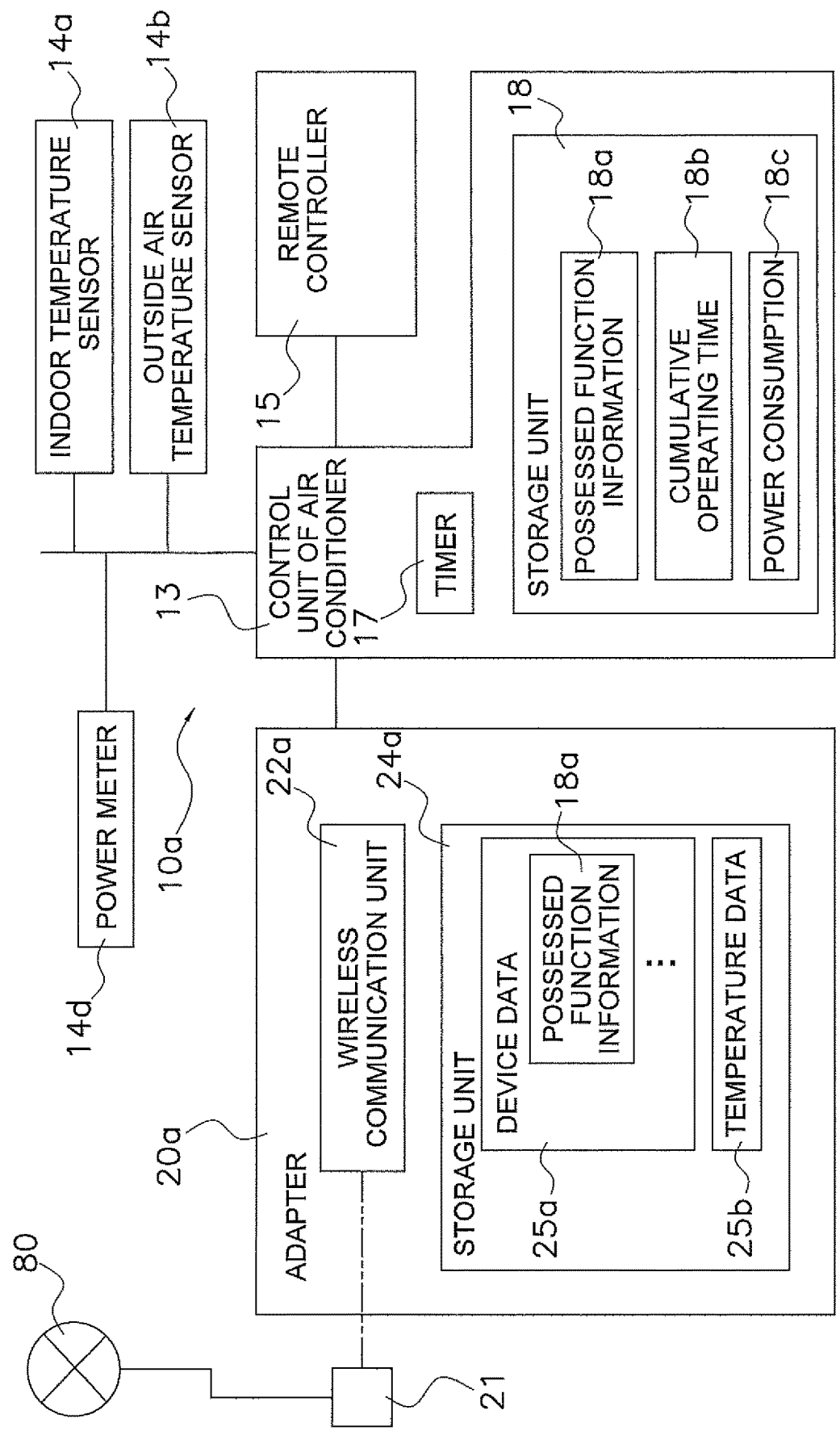
FIG. 2 is a block diagram that explains the configurations of a control unit and an adapter of an air conditioner.

The indoor unit 11a and the outdoor unit 12a are connected to each other via a refrigerant pipe, which forms part of a refrigeration circuit that includes a compressor, a heat exchanger, and the like (not illustrated in the drawings). As illustrated in FIG. 2, the air conditioner 10a has a variety of sensors. In one example, the indoor unit 11a has an indoor temperature sensor 14a that detects the temperature of the room 30a in which the indoor unit 11a is installed. Meanwhile, the outdoor unit 12a has an outside air temperature sensor 14b that detects the temperature of outside air near the building 30.

Additionally, the air conditioner 10a has a control unit 13. The control unit 13 includes control units of the indoor unit 11a and the outdoor unit 12a of the air conditioner 10a. The control unit 13 controls the operation of the air conditioner 10a, that is, controls the actions of the compressor and other components of the refrigeration circuit, in accordance with operation commands input, via a remote controller 15, into the air conditioner 10a by a user in the room 30a.

Additionally, the control unit 13 sends device data 25a related to the air conditioner 10a to the adapter 20a. In one example, the control unit 13 sends, to the adapter 20a, data indicating the content of a control command for the indoor unit 11a, input via the remote controller 15. The "data indicating the content of an operation command" is an operation start/operation stop, operation mode (cooling mode, heating mode, blowing mode, and the like), set temperature, and the like of the air conditioner 10a. The device data 25a sent to the adapter 20a includes possessed function information 18a (described later), cumulative operating time 18b, power consumption 18c, and the like.

Additionally, the control unit 13 sends, to the adapter 20a, temperature data 25b related to the indoor temperature and the outside air temperature. Specifically, the control unit 13 sends, to the adapter 20a, room temperature data detected by the indoor temperature sensor 14a and outside air temperature data detected by the outside air temperature sensor 14b.

Moreover, the control unit 13 executes control commands sent from the adapter 20a. The "control commands sent from the adapter 20a" includes commands ordering the sending of operation commands for the indoor unit 11a and/or specific device data to the adapter 20a.

The control unit 13 is provided with a CPU and a storage unit 18 including RAM and ROM. In the storage unit 18, the possessed function information 18a is stored in the ROM, and the cumulative operating time 18b, the power consumption 18c, and the like are stored in the RAM. The cumulative operating time 18b is the cumulative operating time of the air conditioner 10a, as counted by a timer 17. The power consumption 18c is the power consumed by the air conditioner 10a, as measured by a power meter 14d.

The possessed function information 18a is information related to functions possessed by the air conditioner 10a. As illustrated in FIG. 4, the possessed function information 18a is information that distinguishes between functions actually possessed and functions not possessed by the air conditioner 10a of a plurality of functions with which an air conditioner can be provided. In the air conditioning system 100, the possessed function information 18a includes first information (code XX1 in FIG. 4), second information (code XX2 in FIG. 4), third information (code XX3 in FIG. 4), fourth information (code XX4 in FIG. 4), and fifth information (code XXX in FIG. 4). In one example, the first information is information of whether the air conditioner 10a has a time measurement function to measure the cumulative operating time. According to the possessed function information 18a illustrated in FIG. 4, it is clear that the air conditioner 10a is not provided with a function to perform laundry drying operations, a function to change wind direction by remote control, or a person detection function, and is provided with the function to measure cumulative operating time and a function to measure power consumption. As described above, the possessed function information 18a is sent to the adapter 20a as a portion of the device data 25a, and is stored in a storage unit 24a of the adapter 20a.

(2-2) Information Mediation Devices

The information mediation devices are devices that use the public line 80 to enable exchange of information between the air conditioners 10a and 10b and the mobile terminal 50. In the air conditioning system 100, the information mediation devices include the adapters 20a and 20b, the router 21, and the server 40.

(2 2-1) Adapters

The adapters 20a and 20b are network adapters for connecting the air conditioners 10a and 10b to the LAN 81.

The adapter 20a and the adapter 20b have the same fundamental configuration and, as such, the adapter 20a is used as an example in the following description.

As illustrated in FIG. 2, the adapter 20a includes a CPU, a wireless communication unit 22a, and a storage unit 24a. The adapter 20a has a communication function to eliminate phase differences in communication protocols between networks and also a control function to control the air conditioners 10a and 10b. The adapter 20a is connected by wire to the control unit 13 of the indoor unit 11a, and receives power from the indoor unit 11a to operate (not illustrated in the drawings).

The device data 25a, the temperature data 25b, and the like are stored in the storage unit 24a. As described above, these pieces of data 25a and 25b are pieces of data related to the air conditioner 10a that are sent from the air conditioner 10a to the adapter 20a. Moreover, the adapter 20a periodically (every one minute in this case) compiles these pieces of data 25a and 25b as information of the air conditioner 10a and sends the compiled information to the server 40 via the public line 80.

A server address is stored in advance in the storage unit 24a. A device ID allocated to the adapter 20a by the server 40 is also stored in the storage unit 24a. The device ID, which is an identification code of the adapter 20a, is information whereby the server 40 uniquely identifies the adapter 20a.

(2-2-2) Router

The router 21 is a communication device that has a WAN side interface and a LAN side interface and that connects these two networks to each other. The router 21 automatically detects the presence of the adapters 20a and 20b when the adapters 20a and 20b are connected to the LAN 81, and registers network information of the adapters 20a and 20b. As a result, the adapters 20a and 20b enable communication with the other network devices on the LAN 81 and network devices on the public line 80 (on the Internet). In the air conditioning system 100, the router 21 fulfills the role of constructing the LAN 81 in the building 30.

(2-2-3) Server

The server 40 is a computer that is provided on the public line 80 (on the Internet) to perform air conditioning management services, and that runs server software. As illustrated in FIG. 3, the server 40 has a storage unit 43.

Figure 5:
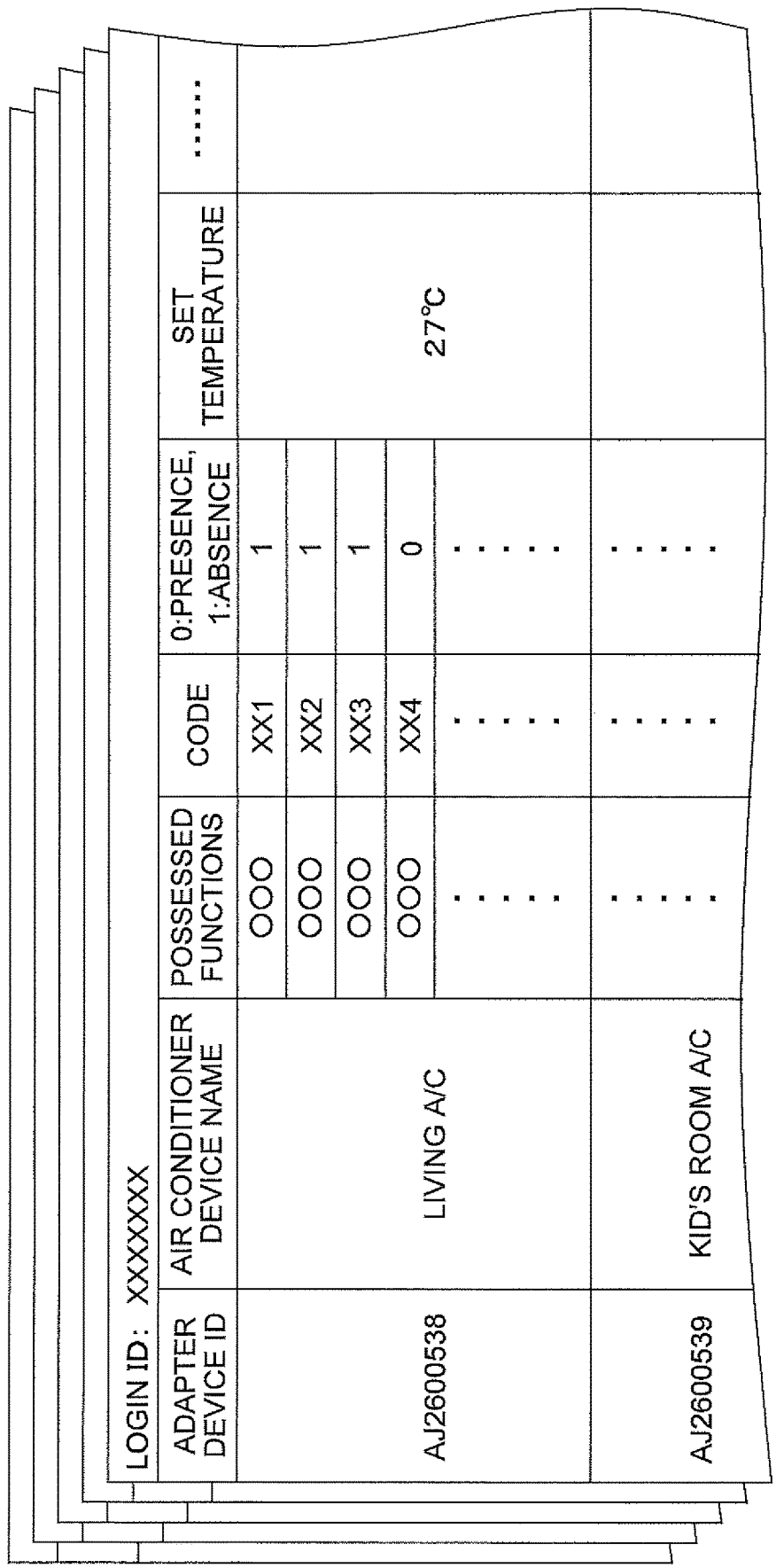
FIG. 5 is a drawing illustrating the content of data stored in an adapter-specific database on the server.

The storage unit 43 has a database for accumulating a variety of data related to the air conditioners 10a and 10b. Specifically, the storage unit 43 has an adapter-specific database 43a. The server 40 accumulates, by adapter, the device data 25a, the temperature data 25b and the like of the air conditioner. The device data 25a, the temperature data 25b and the like are sent periodically from the adapter 20a. As illustrated in FIG. 5, the variety of data related to the air conditioners 10a and 10b is stored in the adapter-specific database 43a in a manner associated with the device IDs allocated to the adapters 20a and 20b connected to the air conditioners 10a and 10b.

Note that, in the adapter-specific database 43a, information of an air conditioner to which one adapter is connected is stored together with information of an air conditioner to which a related adapter, which is different from the previously mentioned adapter, is connected as one record. For example, as described later, when there are two adapters 20a and 20b which have been subjected to initial setting by the same mobile terminal 50, the server 40 identifies both of the adapters 20a and 20b as related adapters that are related to each other.

A variety of setting information by the user of the air conditioners 10a and 10b is also stored in the adapter-specific database 43a. The device IDs of the adapters 20a and 20b to which the registered air conditioners 10a and 10b are connected, device names for the air conditioners 10a and 10b optionally set by the user, the possessed function information 18a related to the functions possessed by the air conditioners 10a and 10b, set temperatures of the air conditioners 10a and 10b, allowance (ON/OFF) of external operation of the air conditioners 10a and 10b, and personal information of the user including a login ID and a password assigned to the user of the air conditioners 10a and 10b are stored as one record in the adapter-specific database 43a. The password is for authenticating login rights when the user uses the login ID to login to the server 40 via the public line 80.

The server 40 sends, via the public line 80, the variety of data stored in the adapter-specific database 43a to the mobile terminal 50 of the user in response to a request from the mobile terminal 50 of the user executing an air conditioning management application 54.

Additionally, the server 40 sends an operation command, for operating the air conditioners 10a and 10b that is received from the mobile terminal 50 via the public line 80, to the adapters 20a and 20b when there has been an access from the adapters 20a and 20b.

(2-3) Mobile Terminal

The mobile terminal 50 is a terminal carried by the user of the air conditioners 10a and 10b, examples thereof including mobile phones, smartphones, tablet computers, notebook computers, and other portable computers. In the following, an example is described of a case in which a smartphone 500 is used as the mobile terminal 50.

As illustrated in FIG. 3, the smartphone 500 is provided with a controller 52 including a CPU, a first wireless communication unit 51a, a second wireless communication unit 51b, a storage unit 53, and the like, and a touchscreen device 55 responsible for input and output functions. The first wireless communication unit 51a has a function for connecting to the public line 80. The second wireless communication unit 51b wirelessly communicates via Wi-Fi (registered trademark) and, as such, fulfills a role of connecting to the adapters 20a and 20b via the LAN 81 in the building 30, without passing through the public line 80. The touchscreen device 55 functions as a display screen and also fulfills a role as operation buttons. The operation buttons are buttons included in images displayed on the display screen.

The air conditioning management application 54 for managing the air conditioners 10a and 10b by the smartphone 500 is installed on the smartphone 500. The user downloads the air conditioning management application 54 from the server 40 via the public line 80. The user can monitor information of the air conditioners 10a and 10b and operate the air conditioners 10a and 10b via images generated by the air conditioning management application 54 and provided to the touchscreen device 55. The air conditioning management application 54 possesses the internet address of the server 40, which is the connection destination, from the beginning.

(3) Initial Settings

The air conditioning system 100 becomes usable by connecting the adapters 20a and 20b to the air conditioners 10a and 10b, causing the router 21 to recognize the adapters 20a and 20b, the user downloading and installing the air conditioning management application 54 on the smartphone 500 as described above, and the user performing initial settings in the building 30 such as a residence.

Upon connection of the adapters 20a and 20b to the air conditioners 10a and 10b, the adapters 20a and 20b first acquire the information of the air conditioners 10a and 10b, such as the device data 25a and the temperature data 25b, and store the acquired information in the storage unit 24a. Next, using the function of wireless connection settings of the adapters 20a and 20b, the user causes the router 21 to recognize the adapters 20a and 20b and connects the adapters 20a and 20b to the LAN 81.

Figure 6A:
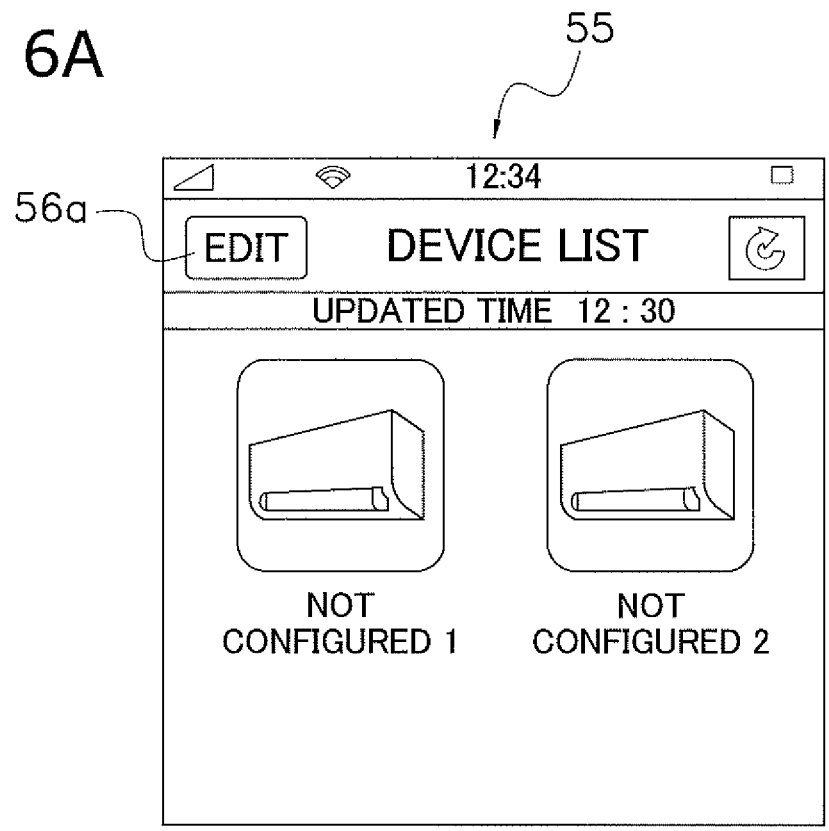
FIG. 6A is a drawing illustrating a list screen of air conditioners displayed on a touchscreen device of the smartphone when performing initial settings.

Then, in the building 30, the user starts the air conditioning management application 54 installed on the smartphone 500. Then, the smartphone 500 running the air conditioning management application 54 (hereinafter referred to simply as "air conditioning management application 54") searches, via the second wireless communication unit 51b and the router 21, for the adapters 20a and 20b connected to the LAN 81 and, as illustrated in FIG. 6A, displays a list thereof on the touchscreen device 55.

When the user taps an icon of a device labeled "Not Configured 1" and presses an edit button 56a, a subsequent screen (see FIG. 6B) is displayed for inputting a device name and an installation location, and performing other settings. In one example, when "Living" is input as the device name for the air conditioner 10a, from the next time, "Living" will be displayed instead of "Not Configured 1" on the list screen of air conditioners.

Figure 6B:
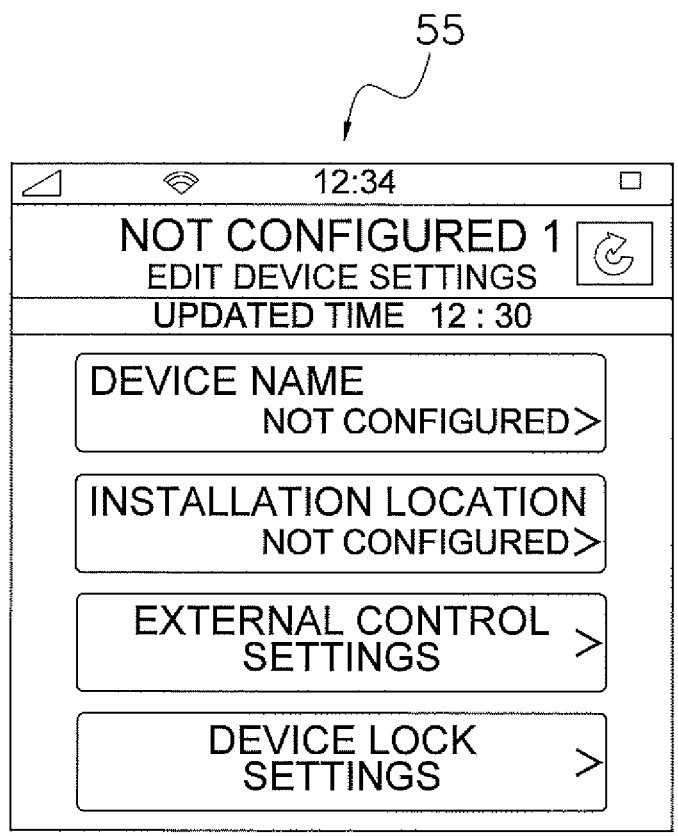
FIG. 6B is a drawing illustrating a setting screen for an air conditioner displayed on the touchscreen device of the smartphone when performing initial settings.

Upon selecting "External Operation Settings" illustrated in FIG. 6B and changing the setting thereof form "OFF" to "ON", the air conditioning management application 54 will prompt the user to perform initial settings for operating that air conditioner from outside the building 30. In this case, the user sets a login ID and a password. In cases where the air conditioning management application 54 recognizes the presence of two or more of the adapters 20a and 20b on the same LAN 81, the user can manage the adapters 20a and 20b using the same login ID and password. In cases where the same login ID and password are set for the plurality of the adapters 20a and 20b, when the air conditioners 10a and 10b are monitored and/or operated from outside, a plurality of devices are displayed on the air conditioner list screen and are selectable.

When the login ID and the password are set, the adapters 20a and 20b automatically access the server 40 via the router 21. At this time, the adapters 20a and 20b send information identifying themselves to the server 40. When the server 40 is accessed by the adapters 20a and 20b, as described above, the server 40 assigns device IDs to the adapters 20a and 20b and adds a record to the adapter-specific database 43a based on those IDs. Upon receipt of the device IDs from the server 40, the adapters 20a and 20b store their own device IDs in the storage unit 24a. Next, in response to requests from the server 40, the adapters 20a and 20b send the information of the air conditioners 10a and 10b including the possessed function information 18a, which is in the storage unit 24a, to the server 40. The server 40 enters the information of the air conditioners 10a and 10b sent from the adapters 20a and 20b in the adapter-specific database 43a of the storage unit 43, associated with the device IDs of the adapters 20a and 20b. When the user accesses the server 40 from outside for the first time using the smartphone 500, the login ID, and the password, the server 40 issues a request to the adapters 20a and 20b for the information of the air conditioners 10a and 10b.

Note that each record by device ID in the adapter-specific database 43a is also associated with the login ID and the password determined by the user in the air conditioning management application 54 in which the adapters 20a and 20b were set. Moreover, for the plurality of adapters 20a and 20b managed by the same login ID and password, the records by device ID may be collectively saved as one record in the adapter-specific database 43a of the server 40, as illustrated in FIG. 5.

After the initial settings, when the user starts the air conditioning management application 54 using the smartphone 500, an initial screen including input fields for the login ID and the password is displayed on the touchscreen device 55 of the smartphone 500. At this time, if the user does not input the provided login ID and the set password in the login ID and password input fields of the initial screen, the user cannot use the air conditioning management application 54 to view the information of the air conditioners 10a and 10b saved in the storage unit 43 of the server 40 or operate the air conditioners 10a and 10b. Thus, the possibility of remote control without authorization is reduced in the air conditioning system 100.

(4) External Monitoring and Operation of Air Conditioner Using Air conditioning Management Application The air conditioning management application 54 has a variety of functions and is provided with, as fundamental functional units, an air conditioner information request unit 54a, an air conditioner information acquisition unit 54b, a management screen generation unit 54c, and a management screen detection area determination unit 54d.

When, outside the building 30, the air conditioning management application 54 on the smartphone 500 is started and the user inputs the login ID and the password, the air conditioner information request unit 54a issues a request to the server 40, via the first wireless communication unit 51a, for the information of the air conditioners 10a and 10b connected to all of the adapters 20a and 20b associated with the login ID. Upon receipt of this information transmission request, the server 40 sends, to the smartphone 500, the variety of data related to the air conditioners 10a and 10b connected to the adapters 20a and 20b associated with the login ID from the adapter-specific database 43a. This variety of data related to the air conditioners 10a and 10b includes the device data 25a including the possessed function information 18a, the temperature data 25b such as the set temperature, and the like.

The data related to the air conditioners 10a and 10b is received by the air conditioner information acquisition unit 54b of the air conditioning management application 54 and is temporarily stored in the memory of the smartphone 500. The management screen generation unit 54c of the air conditioning management application 54 generates, on the basis of the possessed function information 18a and other data related to the air conditioners 10a and 10b, an air conditioner management screen for monitoring and operating, and displays this management screen for monitoring and operating on the touchscreen device 55. Moreover, the management screen detection area determination unit 54d of the air conditioning management application 54 determines, on the basis of the possessed function information 18a and other data related to the air conditioners 10a and 10b, detection areas in which contact with the screen of the touchscreen device 55 is to be detected and which correspond to the air conditioner management screen.

As illustrated in FIG. 3, the touchscreen device 55 includes a display 551 and a touch sensor 552. The controller 52 controls the display 551 of the touchscreen device 55 by the management screen generation unit 54c to control a display function of the touchscreen device 55. Additionally, the controller 52 controls the touch sensor 552 of the touchscreen device 55 by the management screen detection area determination unit 54d to control an input function of the touchscreen device 55.

Figure 7:
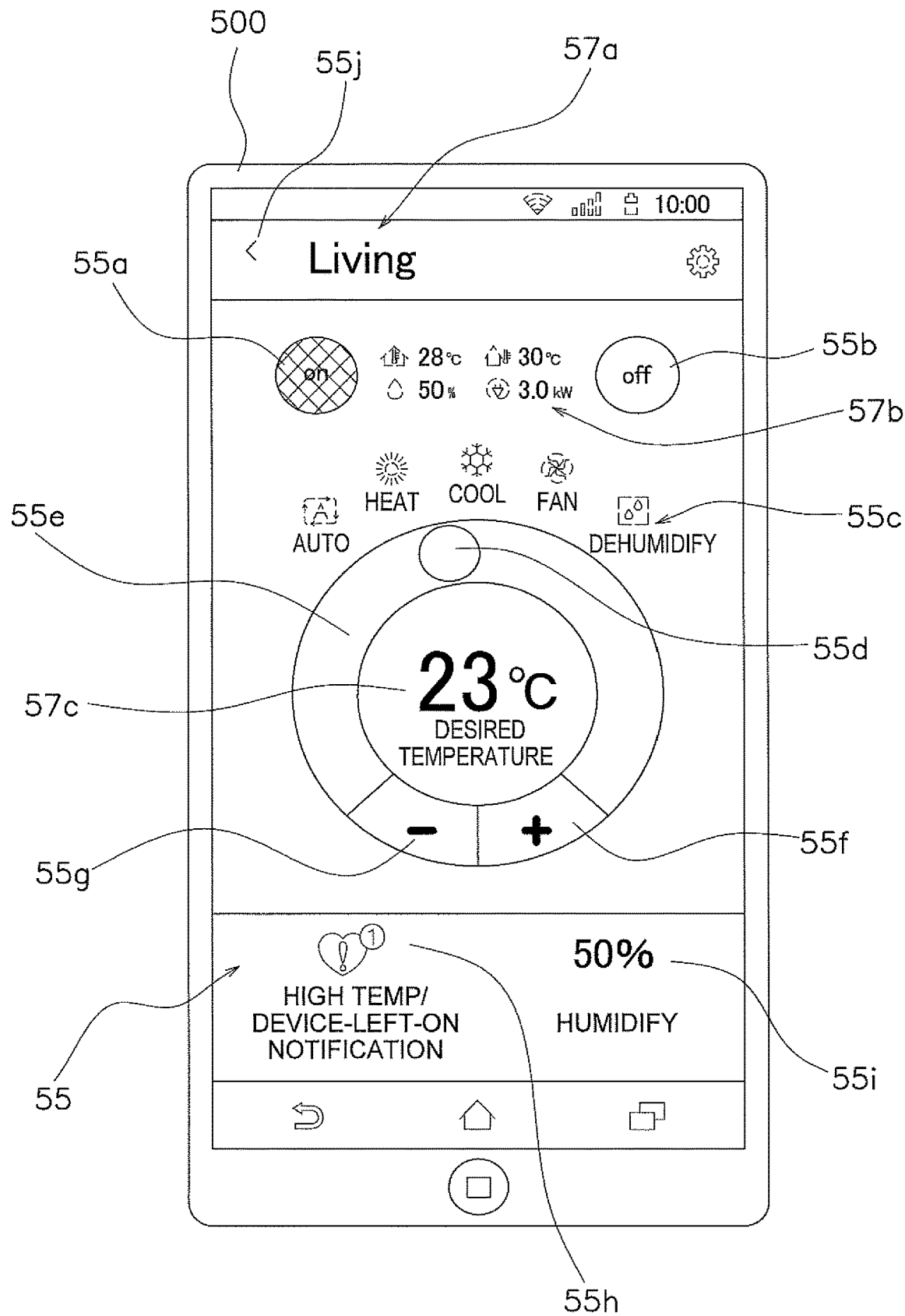
FIG. 7 is a drawing illustrating an example of an air conditioner management screen of an air conditioner selected by a user.

Specifically, when the air conditioning management application 54 of the smartphone 500 is started, first, a list image of the air conditioners 10a and 10b that can be monitored and/or operated is displayed. Then, when the user taps one icon of, for example, the air conditioner 10a, which is included in the list image on the touchscreen device 55, the air conditioner management screen for monitoring and operating of the air conditioner 10a "Living" is displayed, as illustrated in FIG. 7.

The management screen generation unit 54c references the data related to the air conditioner 10a temporarily stored in the storage unit 53, and generates a display image of a device name area 57a for displaying information that the device name is "Living." Additionally, the management screen generation unit 54c references the data related to the air conditioner 10a temporarily stored in the storage unit 53, and generates a display image of a first information area 57b for displaying, as the information related to the air conditioners 10a and 10b, that an indoor temperature is 28° C., an outdoor temperature is 30° C., an indoor humidity is 50%, and an instantaneous power consumption is 3.0 kW. The management screen generation unit 54c also generates a display screen of a second information area 57c for displaying the set temperature to which the air conditioner 10a is set.

Furthermore, the management screen generation unit 54c references the data related to the air conditioner 10a temporarily stored in the storage unit 53, and generates display screens for an ON button 55a for starting the operation of the air conditioner 10a, an OFF button 55b for stopping the operation of the air conditioner 10a, a plurality of operation mode buttons 55c for switching an operation mode of the air conditioner 10a, a drag-type temperature setting button 55d capable of continuously changing the set temperature, a movement path 55e along which the temperature setting button 55d moves, a plus button 55f for raising the set temperature, a minus button 55g for lowering the set temperature, a high temperature/device-left-on notification button 55h for transitioning to a display screen of a high temperature/device-left-on display screen, a humidity adjustment button 55i for humidifying to adjust humidity, a back button 55j for returning to a previous display screen, and the like.

When generating the display screens of the various buttons described above, the management screen generation unit 54c may, for example, provide different information to the user by changing colors and/or brightnesses of the buttons. The management screen generation unit 54c changes the color and/or the brightness of, for example, the ON button 55a and the OFF button 55b to display whether the air conditioner 10a is in operation or if operation is stopped, or changes the color and/or the brightness of, for example, a location corresponding to a current mode among the operation mode buttons 55c to display the current mode of the air conditioner 10a.

Note that there are cases in which the management screen generation unit 54c changes the configuration of the air conditioner screens depending on the possessed function information 18a of the air conditioner 10a named "Living." For example, in the air conditioner management screen illustrated in FIG. 7, when the possessed function information 18a of FIG. 4 indicates that the air conditioner 10a named "Living" is provided with a high temperature/device-left-on notification function, the high temperature/device-left-on notification button 55h for transitioning to the display screen of the high temperature/device-left-on notification is displayed but, in cases where the possessed function information 18a indicates that the air conditioner 10a is not provided with the high temperature/device-left-on notification function, the management screen generation unit 54c generates a display screen without the high temperature/device-left-on notification button 55h.

The management screen detection area determination unit 54d sets the detection areas in correspondence with disposal positions of the variety of buttons generated by the management screen generation unit 54c. In one example, the management screen detection area determination unit 54d disposes an ON input detection area 58a at a location overlapping with a display position of the ON button 55a, disposes an OFF input detection area 58b at a location overlapping with a display position of the OFF button 55b, disposes a plurality of mode input detection areas 58c at locations overlapping with display positions of the plurality of operation mode buttons 55c, disposes a temperature change input detection area 58d at a location overlapping with a display position of the temperature setting button 55d, disposes a temperature raise input detection area 58f at a location overlapping with a display position of the plus button 55f, disposes a temperature lower input detection area 58g at a location overlapping with a display position of the minus button 55g, disposes a notification request input detection area 58h at a location overlapping with a display position of the high temperature/device-left-on notification button 55h, disposes a humidification input detection area 58i at a location overlapping with a display position of the humidity adjustment button 55i, and disposes a screen change input detection area 58j at a location overlapping with a display position of the back button 55j.

Moreover, the air conditioning management application 54 receives operation inputs of the air conditioner 10a from the user via the air conditioner management screen of the touch sensor 552 of the touchscreen device 55. When the user presses the OFF button 55b in the air conditioner management screen illustrated in FIG. 7, the touch sensor 552 detects that there has been a contact in the OFF input detection area 58b. When the touchscreen 552 detects that there has been a contact in the OFF input detection area 58b, the controller 52 of the smartphone 500 sends an operation command to the server 40 to change the air conditioner 10a named "Living" from an ON state to an OFF state. The server 40, having received the operation command to change the air conditioner 10a named "Living" from the ON state to the OFF state, sends the operation command to the adapter 20a when the adapter 20a accesses the server 40. The adapter 20a that has received the operation command sends a command corresponding to that operation command, in this case a stop command, to the air conditioner 10a.

Conversely, when the air conditioner 10a named "Living" is in the OFF state and the user presses the ON button 55a in the air conditioner management screen, the touch sensor 552 detects that there has been a contact in the ON input detection area 58a. When the touch sensor 552 detects that there has been a contact in the ON input detection area 58a, the controller 52 of the smartphone 500 sends an operation command to the server 40 to change the air conditioner 10a named "Living" from the OFF state to the ON state. Likewise, when the user performs an input operation to press the other operation mode buttons 55c, the plus button 55f, the minus button 55g, the high temperature/device-left-on notification button 55h, the humidity adjustment button 55i, the back button 55j, or the like, an operation command corresponding to the button overlapping the detection area of the touch sensor 552 is sent from the air conditioning management application 54 to the server 40. Note that the drag-type input operation for the temperature setting button 55d is described in detail later.

(5) Monitoring and Operating of Air Conditioner Using Air conditioning management Application in the Building When, inside the building 30, the air conditioning management application 54 on the smartphone 500 is started and the user inputs the login ID and the password, the air conditioner information request unit 54a issues a request, via the second wireless communication unit 51b, to the adapters 20a and 20b for the information of the air conditioners 10a and 10b connected to the adapters 20a and 20b. Upon receipt of this information transmission request, the adapters 20a and 20b send the variety of data related to the air conditioners 10a and 10b stored in the storage unit 24a to the smartphone 500. This variety of data related to the air conditioners 10a and 10b includes the device data 25a including the possessed function information 18a, the temperature data 25b such as the set temperature, and the like.

Until the generation of the air conditioner management screen for monitoring and operating, the subsequent actions are the same as in the air conditioning management application 54 of the smartphone 500 when outside the building 30.

Additionally, until the receipt of the operation input of the air conditioners 10a and 10b from the user, the subsequent actions are the same as in the air conditioning management application 54 of the smartphone 500 when outside the building 30. However, when inside the building 30, the operation command is sent from the smartphone 500 to the adapters 20a and 20b via the second wireless communication unit 51b. The adapters 20a and 20b that have received the operation command directly from the smartphone 500 send commands corresponding to that operation command to the air conditioners 10a and 10b.

Figure 9A:
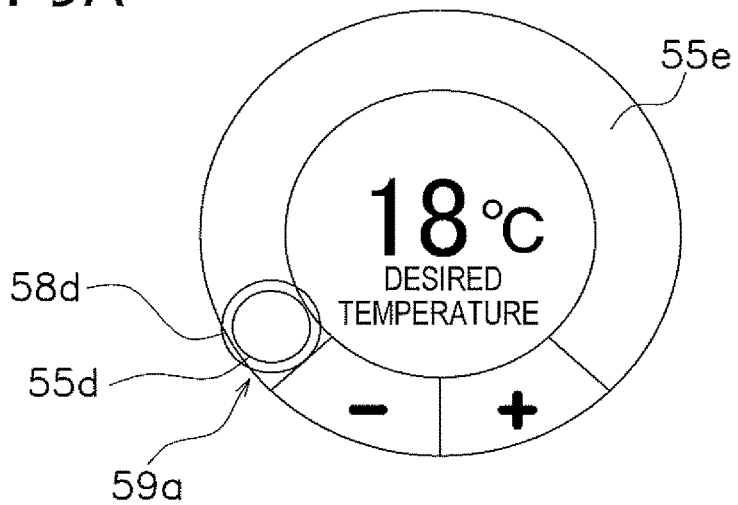
FIG. 9A is a drawing that explains a screen related to the lower limit value of the set temperature.
Figure 9B:
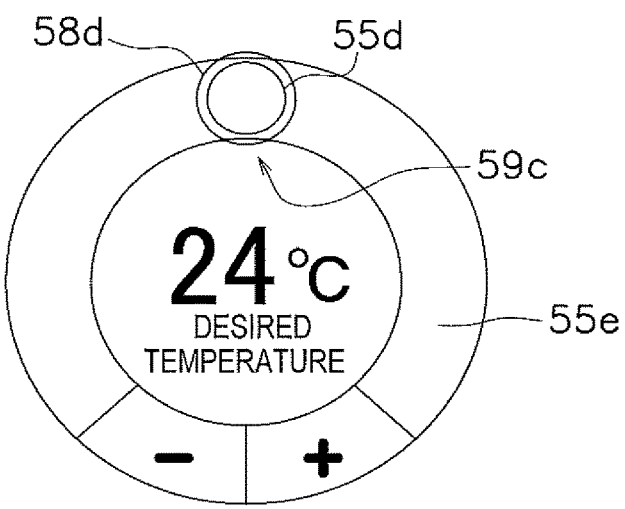
FIG. 9B is a drawing that explains a screen related to the median of the set temperatures.
Figure 9C:
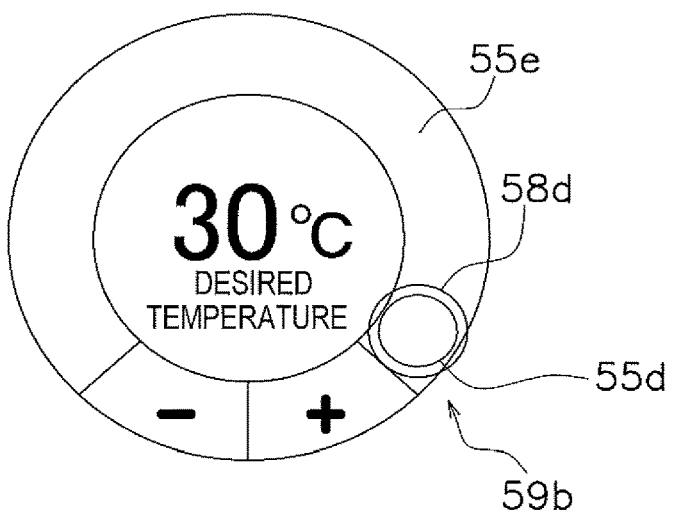
FIG. 9C is a drawing that explains a screen related to the upper limit value of the set temperature.

(6) Changing Set Temperature by Drag Operation (6-1) Temperature Change Input Detection Area and Cancel Area As illustrated in FIGS. 9A, 9B, and 9C, the controller 52 uses the management screen generation unit 54c of the air conditioning management application 54 to generate display images in which the position of the temperature setting button 55d is changed depending on the value of the set temperature. FIGS. 9A to 9C illustrate an example of displays when in a cooling operation mode. In the cooling operation mode, the air conditioner 10a is capable of changing the set temperature in a range of 18° C. to 30° C. With this air conditioner 10a, when the set temperature is, for example, 18° C., the management screen generation unit 54c displays a screen in which the temperature setting button 55d is depicted at a one end 59a of the movement path 55e, that is, at a position of the movement path 55e rotated fully in the counter-clockwise direction (see FIG. 9A); when the set temperature is 30° C., displays a screen in which the temperature setting button 55d is depicted at the other end 59b of the movement path 55e, that is, at a position of the movement path 55e rotated fully in the clockwise direction (see FIG. 9C); and, when the set temperature is 24° C., displays a screen in which the temperature setting button 55d is depicted at a middle section 59c of the movement path 55e, which is between the one end 59a and the other end 59b (see FIG. 9B). Provided that temperature setting of the air conditioner 10a can be performed at 1° C. intervals, each time the value of the set temperature is increased 1° C. in the range of 19° C. to 23° C., the management screen generation unit 54c displays a screen in which the position of the temperature setting button 55d is moved toward the middle section 59c from the one end 59a. Additionally, each time the value of the set temperature is increased 1° C. in the range of 24° C. to 30° C., the management screen generation unit 54c displays a screen in which the position of the temperature setting button 55d is moved toward the other end 59b from the middle section 59c.

In the display screens illustrated in FIGS. 9A to 9C, prior to the temperature setting button 55d being touched, the management screen detection area determination unit 54d determines the disposal of the temperature change input detection area 58d at the location overlapping with the temperature setting button 55d. Accordingly, commands corresponding to temperature setting operation commands will not be sent when locations of the movement path 55e other than where the temperature setting button 55d is depicted are touched.

Figure 10:
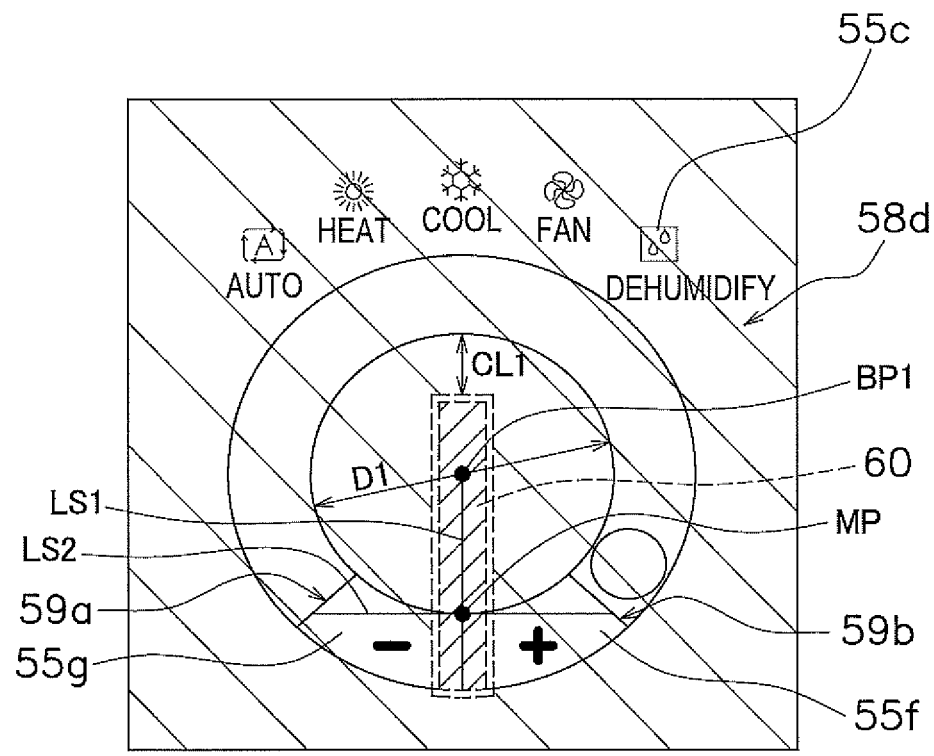
FIG. 10 is a drawing that explains the setting of a temperature change input detection area and a cancel area.

When the temperature setting button 55d is touch-operated, that is, when contact with the temperature change input detection area 58d is detected, the controller 52 expands the temperature change input detection area 58d as illustrated in FIG. 10. In this expansion, the temperature change input detection area 58d, which was substantially the same size as the temperature setting button 55d in the movement path 55e, is made larger than the movement path 55e. The expanded temperature change input detection area 58d is maintained in the expanded state as long as contact with the temperature change input detection area 58d continues. In other words, the controller 52 maintains the expanded temperature change input detection area 58d, such as that in FIG. 10, as long as the temperature setting button 55d is being drag-operated. In this disclosure, the term "drag operation" refers to an operation including touching a button on a screen of the display 551 compatible with drag operation, performing a swipe operation to move the button while touching the button, and then, releasing the touching of the screen. Accordingly, even if a button that is compatible only with touch operation (also referred to as "tap operation"), that is, a button that can detect being touched but cannot detect being moved, is touched and, while touched, is swiped to move the button, this operation is not a drag operation. A button compatible with drag operation is also referred to as a "drag button." An area where the drag operation is possible is also referred to as a "drag area."

Accordingly, since the temperature change input detection area 58d is expanded to the point of overlapping with the plus button 55f and the minus button 55g, the temperature raise input detection area 58f and the temperature lower input detection area 58g will no longer exist at the locations overlapping with the plus button 55f and the minus button 55g. As such, even if a finger, for example, is slid to the location of the plus button 55f or the minus button 55g during a drag operation of the temperature setting button 55d, tap operation of the plus button 55f or the minus button 55g will be ignored and the drag operation of the temperature setting button 55d will continue. Likewise, since the temperature change input detection area 58d is expanded to the point of overlapping with the operation mode buttons 55c, the mode input detection areas 58c will no longer exist at the locations overlapping with the operation mode buttons 55c. Accordingly, even if a finger, for example, is slid to the location of the operation mode buttons 55c during a drag operation of the temperature setting button 55d, tap operation of the operation mode buttons 55c will be ignored and the drag operation of the temperature setting button 55d will continue.

Additionally, as illustrated in FIG. 10, the controller 52 sets a reference point BP1 at the center of the circular arc-shaped movement path 55e. Furthermore, the management screen detection area determination unit 54d of the controller 52 sets a cancel area 60 on a line segment LS1 connecting the reference point BP1 to a midpoint MP of a line segment LS2 connecting the one end 59a of the movement path 55e to the other end 59b of the movement path 55e. The cancel area 60 is elongated along the line segment LS1. The cancel area 60 is configured such that a length in a direction along the line segment LS1 is greater than a width in an extending direction of the line segment LS2 (direction orthogonal to the line segment LS1). Additionally, in one example, a length of a gap CL1 between the movement path 55e and the cancel area 60 is 30% of an inner diameter D1 of the movement path 55e. If the gap CL1 is too large, the effects of reducing settings of unintended values as the temperature setting value will be diminished, and if too small, normal change operations of the temperature setting value will be impeded. As such, the gap CL1 is set to a range of 20% to 40%, for example, of the inner diameter D1 of the movement path 55e.

(6-2) Drag Operation

Figure 8:
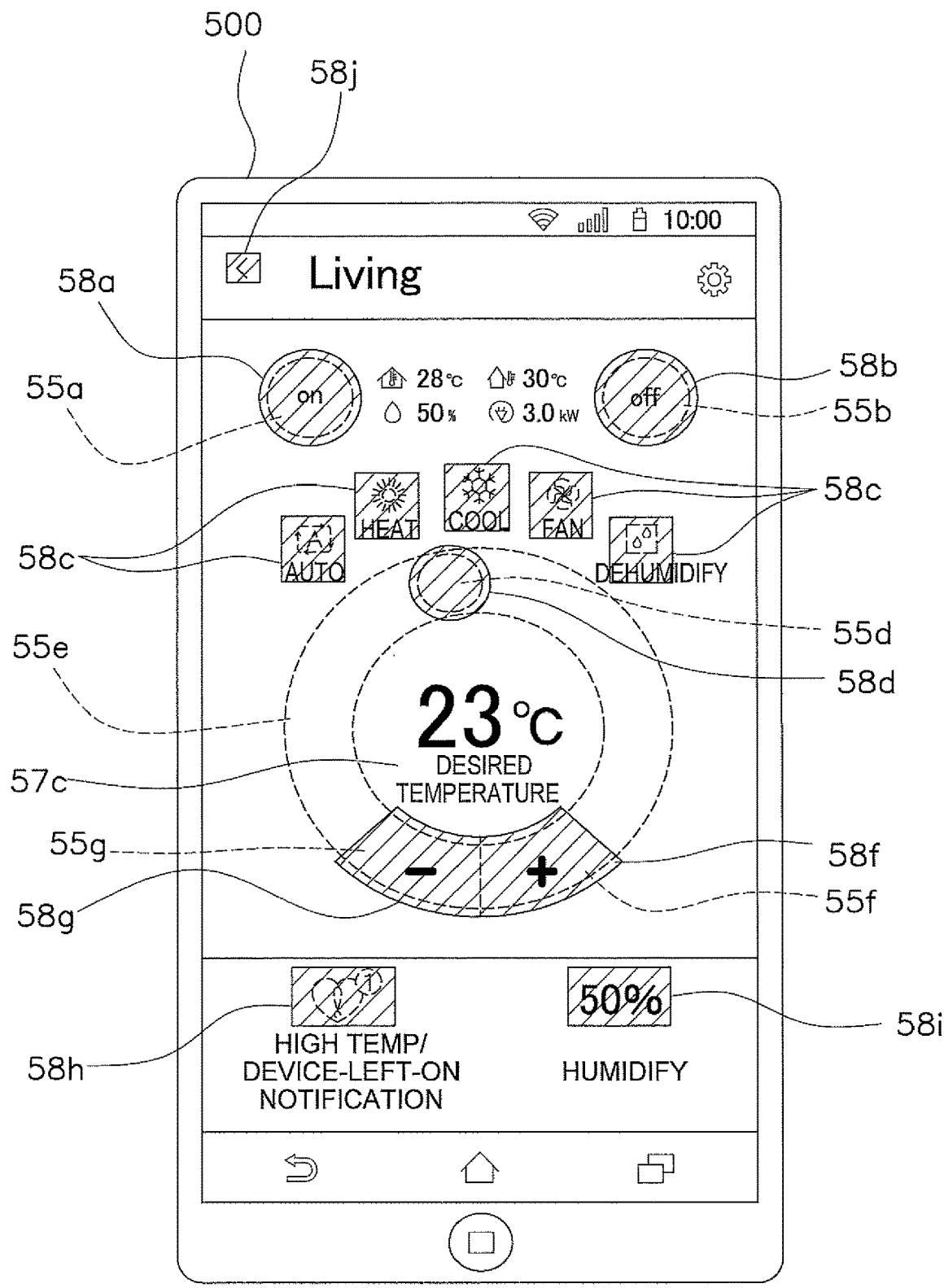
FIG. 8 is a drawing that explains the setting of detection areas for the air conditioner management screen of FIG. 7.
Figure 11A:
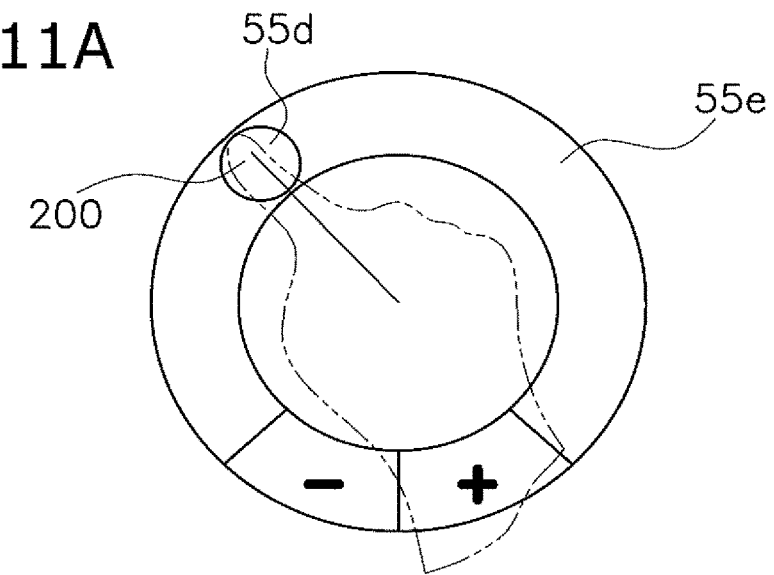
FIG. 11A is a drawing that explains a touch operation on a temperature setting button.
Figure 11B:
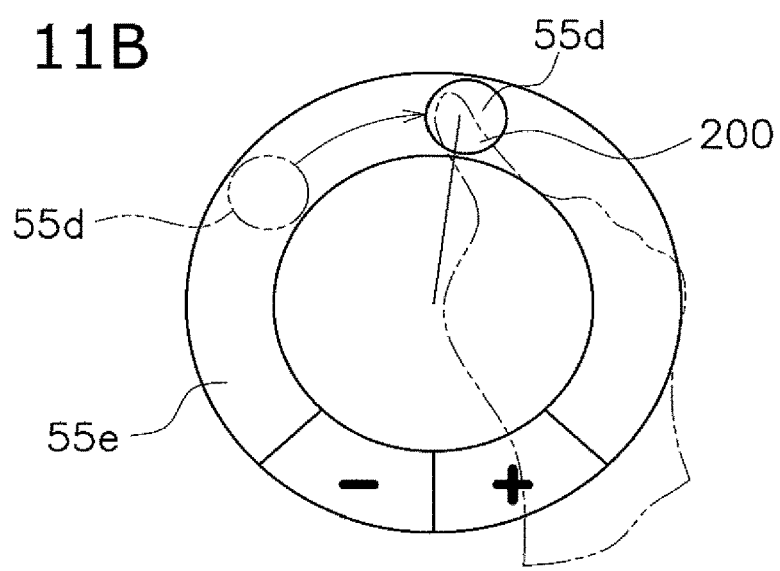
FIG. 11B is a drawing that explains a swipe operation on the temperature setting button.
Figure 11C:
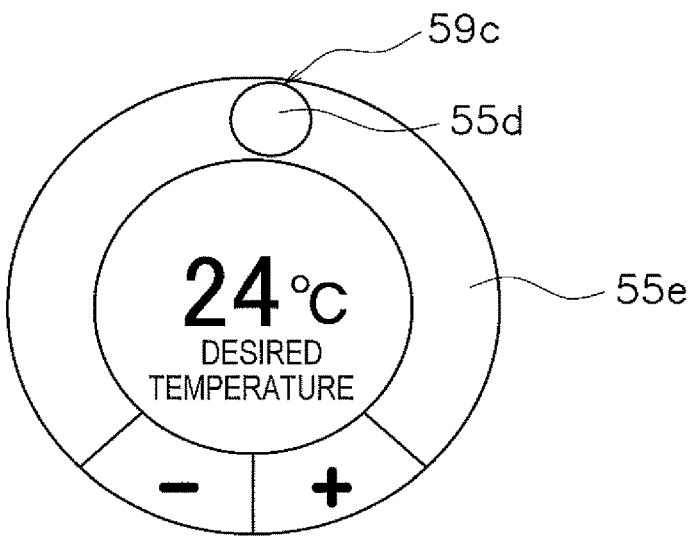
FIG. 11C is a drawing that explains an operation for confirming the value of the set temperature.

Basic drag operations for the temperature setting button 55d are illustrated in FIGS. 11A, 11B, and 11C. The user touches the temperature setting button 55d with a finger 200 (see FIG. 11A). While touching the temperature setting button 55d with the finger 200, the user moves the finger 200 along the movement path 55e. Note that, in FIG. 11B, the temperature setting button 55d illustrated by the dashed circle indicates the point where the movement of the finger 200 started. The management screen generation unit 54c sequentially generates screens so as to re-draw the temperature setting button 55d at the drag operation position that the finger 200 is contacting. Due to the temperature setting button 55d being re-drawn at the position where the finger 200 is contacting, to the user, the temperature setting button 55d appears to be being slid on the movement path 55e by the finger 200. While not illustrated in FIG. 11B, the management screen generation unit 54c displays a value of the set temperature corresponding to the position of the temperature setting button 55d, that is, corresponding to the drag operation position of the finger 200, in a region surrounded by the movement path 55e. Additionally, with a time when the finger 200 is lifted as a boundary, the temperature change input detection area 58d is shrunk from the expanded state illustrated in FIG. 10 to the normal state illustrated in FIG. 8.

The user lifts the finger 200 from the temperature setting button 55d at the location where the desired value of the set temperature is displayed (see FIG. 11C). The value of the set temperature is confirmed as a result of the finger 200 being lifted from the temperature setting button 55d. The value of the set temperature is a value that corresponds to the position where the finger 200 was lifted from the temperature setting button 55d. For example, when the position where the finger 200 was lifted is the middle section 59c of the movement path 55e, the set temperature changes to 24° C.

Next, a description is given of a case in which the finger 200 is moved to a location deviating from the movement path 55e. First, using FIG. 12, an input operation is described for a case in which the finger 200 performs a drag operation that deviates from the movement path 55e. In this case, the finger 200 did not traverse the cancel area 60. First, the finger 200 touched at the position of the temperature setting button 55d illustrated by the dashed circle in FIG. 12. Then, instead of the finger sliding along the basic movement path 55e, the finger 200 moved along the arrow Ar1 and stopped at a location where a drag operation position P1 deviates from the movement path 55e. In such a case, the temperature change input detection area 58d extends throughout the entire FIG. 12, with the exception of the cancel area 60 and, as such, the drag operation position P1 is within the range of the temperature change input detection area 58d. Accordingly, even if the finger 200 stops at the drag operation position P1, the finger 200 is still touching the screen of the display 551 and, as such, the drag operation is being continued.

Figure 12:
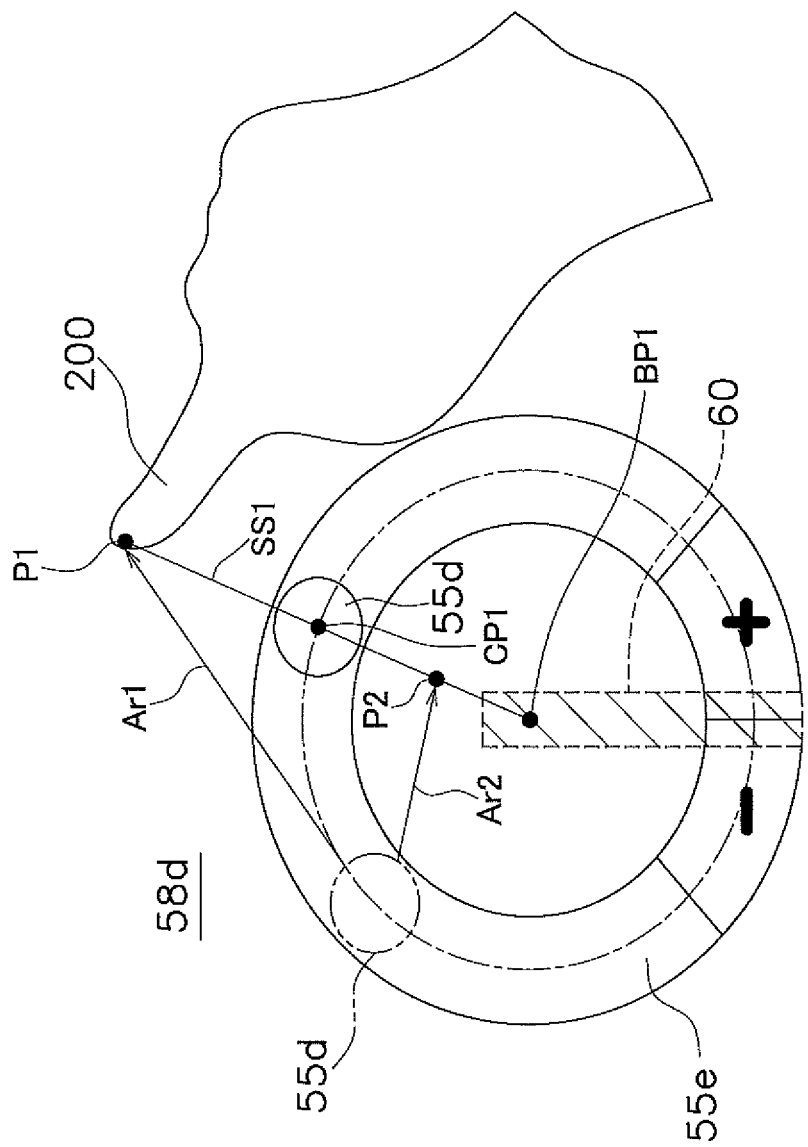
FIG. 12 is a drawing that explains the changing of the value of the set temperature when a swipe operation is performed that deviates from a movement path.

When the finger 200 stops at the drag operation position P1 as in FIG. 12, the controller 52 connects the drag operation position P1 to the reference point BP1 using a straight line SS1. Then, the controller 52 regards the situation as if the temperature setting button 55d had been moved, by the finger 200, to a crossing point where the straight line SS1 crosses the movement path 55e. In other words, the controller 52 moves the drag button, namely the temperature setting button 55d, to a crossing point CP1 where the straight line connecting the drag operation position P1 and the reference point BP1 crosses the movement path 55e in the drag area, namely the temperature change input detection area 58, and changes the temperature setting value to a value corresponding to the position of the temperature setting button 55d. As a result of these actions, the change temperature setting value may be confirmed by simply lifting the finger 200 from the screen of the display 551 at the drag operation position P1. Additionally, the set temperature may be changed to a different value by continuing the swipe operation without lifting the finger 200 from the drag operation position P1.

In the example described using the arrow Ar1 of FIG. 12, the case was described in which the drag operation of the finger 200 deviated outside the movement path 55e. However, the same actions are performed when the drag operation of the finger 200 deviates inside the movement path 55e. For example, in a case in which the finger 200 performs a swipe operation so as to stop at a drag operation position P2 as indicated by the arrow Ar2 in FIG. 12, the set temperature will be the same as when the swipe operation along the arrow Ar1 was performed. That is, the value of the set temperature, when the straight line SS1 extending from the reference point BP1 to the drag operation position P2 is drawn and the temperature setting button 55d is moved to the crossing point CP1 where the straight line SS1 crosses the movement path 55e, is the value when the finger 200 is at the drag operation position P2. Even when the drag operation position P2 is inside the movement path 55e, the value of the set temperature corresponding to the position of the temperature setting button 55d is confirmed when the finger 200 is lifted from the screen of the display 551 at the drag operation position P2.

Figure 13A:
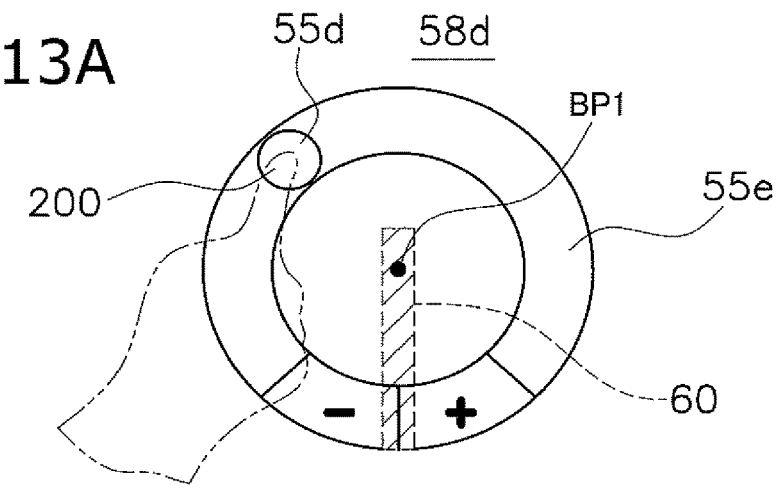
FIG. 13A is a drawing that explains a touch operation on the temperature setting button.
Figure 13B:
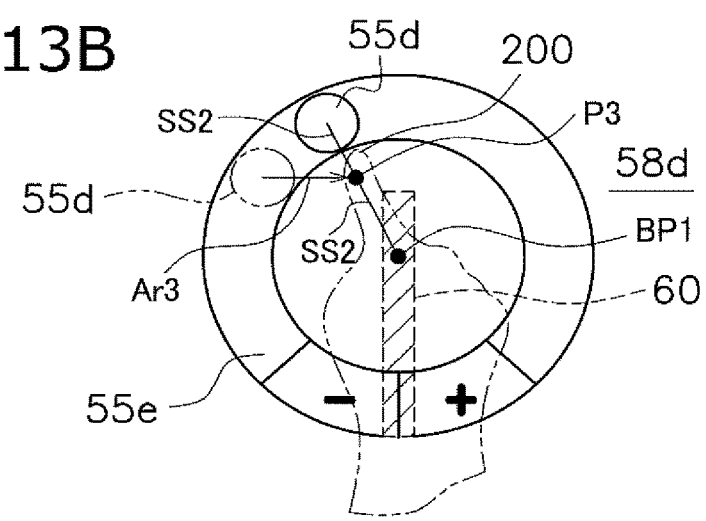
FIG. 13B is a drawing that explains a swipe operation on the temperature setting button.
Figure 13C:
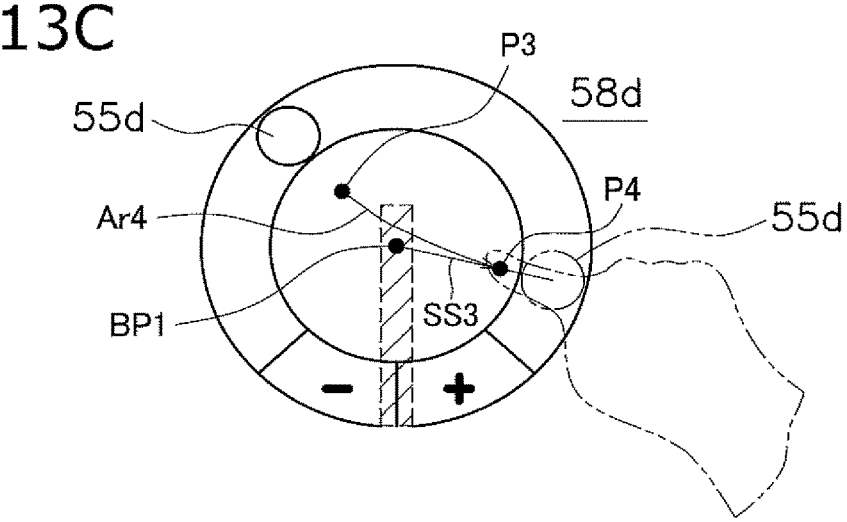
FIG. 13C is a drawing that explains an operation for confirming the value of the set temperature by the cancel area.

Next, using FIGS. 13A, 13B, and 13C an input operation is described for a case in which the finger 200 performs a drag operation that deviates from the movement path 55e. In this case, the finger 200 traverses the cancel area 60. FIG. 13A illustrates a state in which the controller 52 has displayed the movement path 55e and the drag button, namely the temperature setting button 55d on the display 551 using the management screen generation unit 54c. Additionally, in the state illustrated in FIG. 13A, the temperature setting button 55d is touch-operated by the finger 200, and the controller 52 uses the management screen detection area determination unit 54d to provide the reference point BP1 disposed at a location off the movement path 55e, and set the drag area, namely the temperature change input detection area 58d, to be larger than the display range of the movement path 55e. The controller 52 also sets the cancel area 60 using the management screen detection area determination unit 54d. The position of the temperature setting button 55d illustrated in FIG. 13A corresponds to the value of the current set temperature.

Next, as illustrated in FIG. 13B, the finger 200 of the user traces a trajectory indicated by the arrow Ar3 so as to swipe to a drag operation position P3, deviating from the movement path 55e toward the side closer to the reference point BP1. The drag operation is in progress in the state illustrated in FIG. 13B but, as described previously, the temperature setting button 55d is moved to the crossing point where the straight line SS2 connecting the drag operation position P3 to the reference point BP1 crosses the movement path 55e.

For example, in the state illustrated in FIG. 13B, it is assumed that the user intends to lift the finger 200 from the screen of the display 551 in order to end the drag operation. However, in actuality, the user performs an erroneous operation and traces the trajectory indicated by the arrow Ar4 so as to swipe on the screen of the display 551, and lifts the finger 200 from the screen at a drag operation position P4. When such an erroneous operation is performed, if the cancel area 60 is not set, the temperature setting button 55d indicated by the dot-dot-dash line will move on the straight line SS3 that connects the drag operation position P4 with the reference point BP1. The value of the set temperature corresponding to the position of the temperature setting button 55d indicated by the dot-dot-dash line is a temperature that is significantly higher than the temperature that the user intended to set. If the user fails to check the set temperature in such a situation, the air conditioner 10a will maintain the actual room at a high temperature that the user does not intend.

However, as illustrated in FIG. 13C, the cancel area 60 is set and, as such, the controller 52 determines that the drag operation was ended where the arrow Ar4 crosses the cancel area 60, or, in other words, makes a determination to regard the finger 200 as having been lifted from the screen of the display 551 at the location where the arrow Ar4 crosses the cancel area 60. As a result, in a situation such as that illustrated in FIG. 13C, the temperature setting button 55d will move very little due to the erroneous operations of the user, and values resulting from the erroneous operation of the user, significantly different from the value of the set temperature intended to be set by the user, can be reduced from being set as the set temperature.

(7) Modification Examples (7-1) Modification Example 1A

In the embodiment described above, an example is described in which the mobile terminal 50 of the air conditioning system 100, namely the smartphone 500, was used as the setting value change device for changing the temperature setting value of the refrigeration apparatus. However, a configuration is possible in which the value changed by the setting value change device according to the present invention is a hot water amount setting value of a hot water supply device, instead of the temperature setting value of the refrigeration apparatus. Changing of the hot water amount setting value of the hot water supply device is described using FIGS. 14 and 15.

(7-1-1) Overview of Hot Water Supply System

A hot water supply system is configured to send and receive, using the smartphone 500, a portion or all of information such whether or not to supply hot water, whether or not to fill a bathtub with hot water, whether or not to reheat the water in the bathtub, a temperature setting of the hot water supply temperature, and a hot water amount setting of hot water stored in a hot water storage tank.

Figure 14:
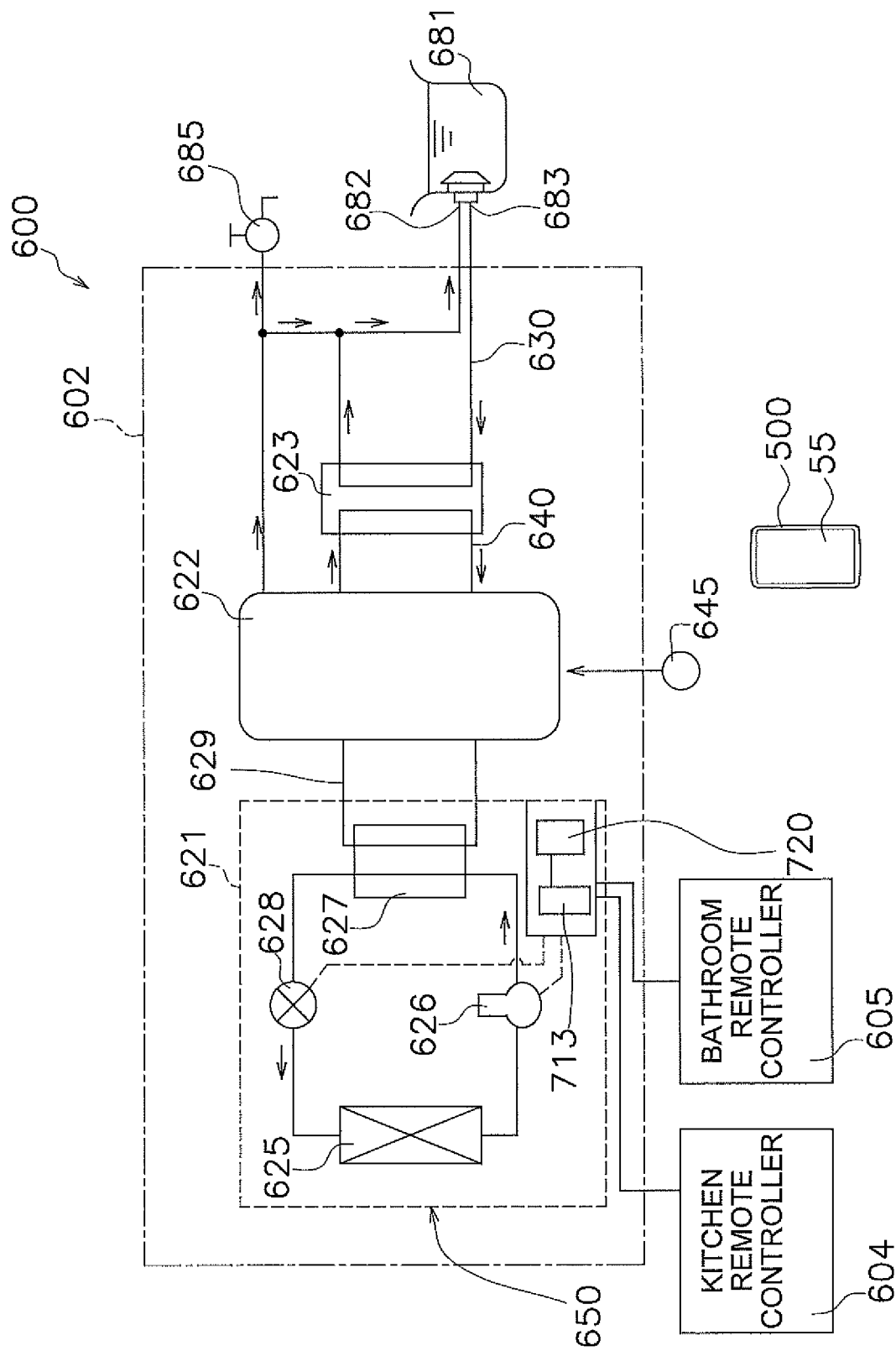
FIG. 14 is a circuit diagram of a hot water supply system according to a modification example.

FIG. 14 illustrates a configuration of a hot water supply system 600 according to Modification Example 1A. The hot water supply system 600 of FIG. 14 is installed in a residence, and includes a hot water supply device 602, a kitchen remote controller 604, and a bathroom remote controller 605. This hot water supply system 600 can supply heated water to a bathtub faucet 682 of a bathtub 681 installed in a bathroom of the residence, and to a water faucet 685 installed in a kitchen or the like.

(7-1-2) Configuration of Hot Water Supply Device 602

Figure 15:
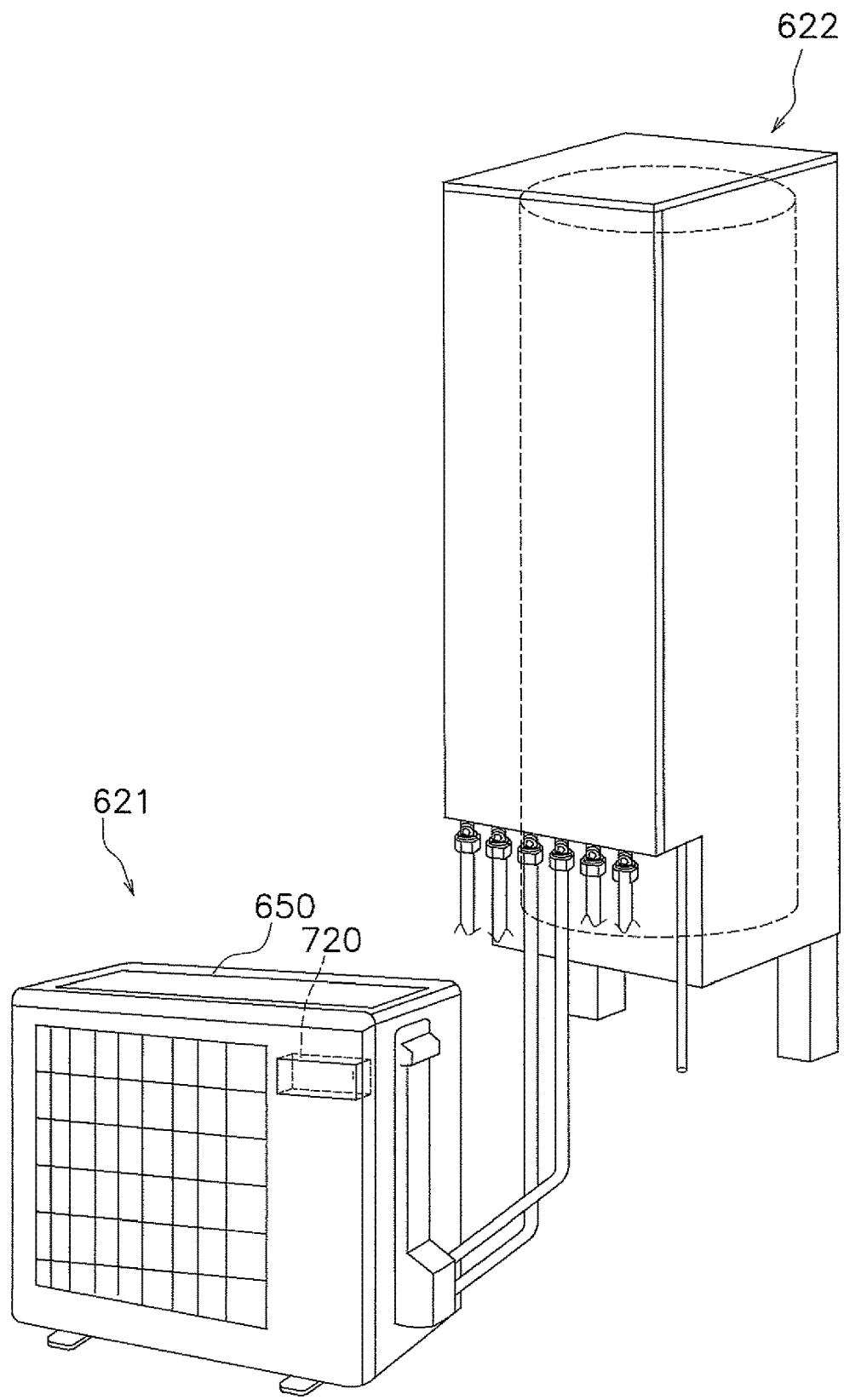
FIG. 15 is a perspective view illustrating a hot water supply device of the hot water supply system of FIG. 14.
Figure 16:
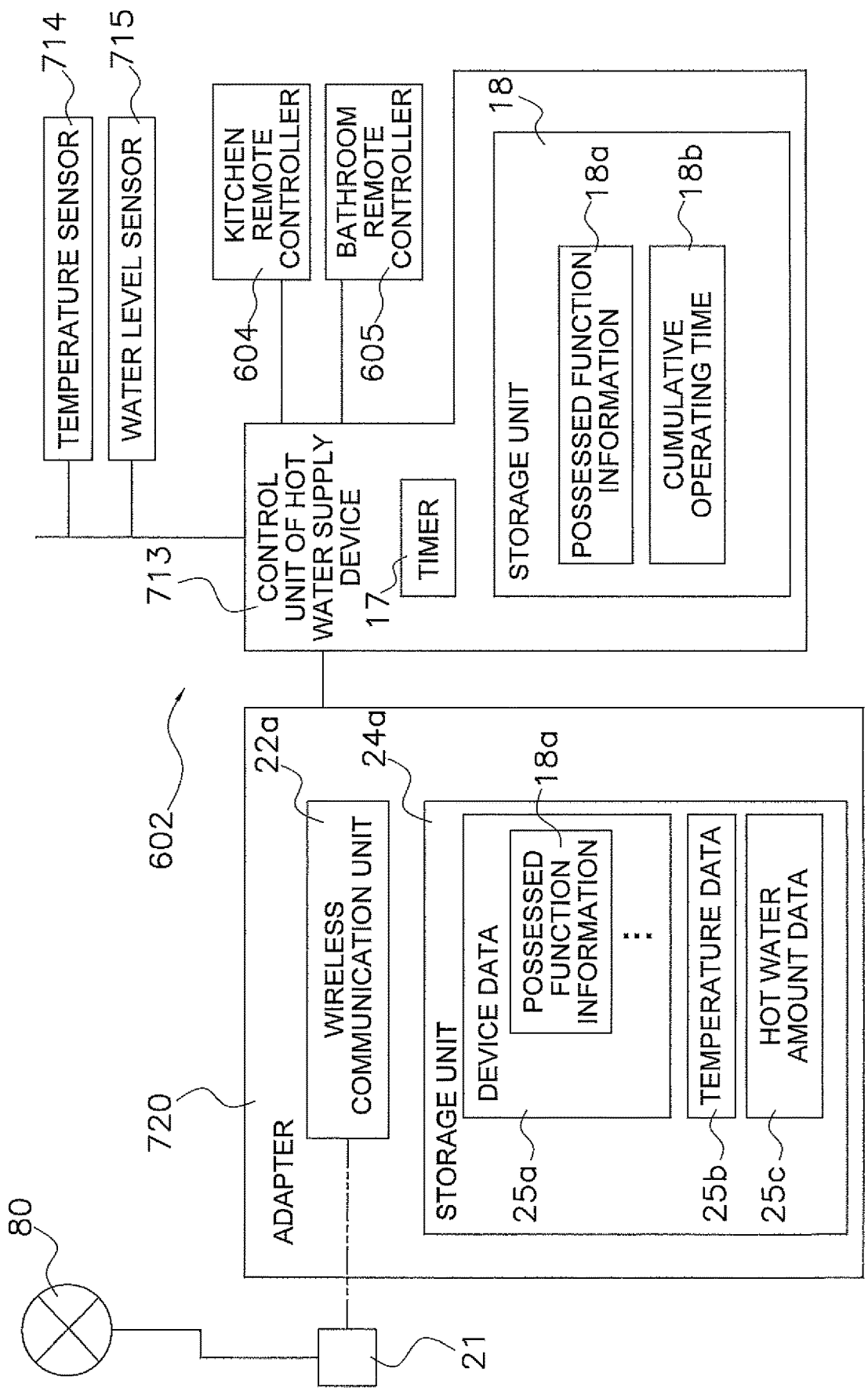
FIG. 16 is a block diagram that explains the configurations of a control unit and an adapter of the hot water supply device.

The hot water supply device 602 includes a heat pump unit 621, a hot water storage tank 622, and a second water heat exchanger 623. FIG. 15 illustrates the appearance of the heat pump unit 621 and the hot water storage tank 622. The heat pump unit 621 includes an air heat exchanger 625, a compressor 626, a first water heat exchanger 627, and an expansion valve 628. These components are sequentially connected to form a refrigeration circuit. The heat pump unit 621 pumps up heat in the atmosphere in the air heat exchanger 625 and transfers the heat to a refrigerant. The refrigerant is compressed in the compressor 626, and the heat of the high-temperature refrigerant is transferred to water flowing through piping 629 in the first water heat exchanger 627. The refrigerant is decompressed and the temperature thereof is lowered at the expansion valve 628 and, then, the low-temperature refrigerant is sent to the air heat exchanger 625.

Water is supplied into the hot water storage tank 622 from a water supply source 645. The water supplied into the hot water storage tank 622 is sent to the piping 629 and boiled in the first water heat exchanger 627. Thus, hot water is made. In accordance with the demand of a user using the hot water supply device 602, the (hot) water stored in the hot water storage tank 622 is supplied to the water faucet 685 and/or supplied to the bathtub 681. Additionally, in accordance with the demand of a user, the water in the bathtub 681 is sent from a bathtub recovery port 683 of the bathtub 681 through a bathtub circulation path 630 to the second water heat exchanger 623, and thereafter returned back into the bathtub 681 through the bathtub faucet 682. At this time, the water in the hot water storage tank 622 is sent through a hot water storage tank circulation path 640 to the second water heat exchanger 623 and, thereafter returned back into the hot water storage tank 622. Thus, the water in the bathtub 681 is warmed up as a result of being subjected to heat exchange with the high-temperature water in the hot water storage tank 622 by the second water heat exchanger 623 (reheating operation).

A control unit 713 made from a microcomputer configured from a CPU, ROM, and the like is installed in a main body casing 650 of the heat pump unit 621. The control unit 713 controls the various functional components in the heat pump unit 621, and also controls the boiling operations, bathtub filing operations, reheating operations, and the like on the basis of detection results of a water level sensor 715 and a temperature sensor 714 disposed in the hot water storage tank 622. The control unit 13 controls the operation of the hot water supply device 602, that is, controls the actions of the compressor 626, the expansion valve 628, and other components of the refrigeration circuit, in accordance with commands input, via the kitchen remote controller 604, the bathroom remote controller 605, and the smartphone 500, into the hot water supply device 602 by the user. Additionally, the control unit 713 outputs information related to the hot water supply device 602 to the kitchen remote controller 604 and the bathroom remote controller 605. Examples of the information related to the hot water supply device 602 include information indicating whether or not the hot water supply device 602 is currently performing a variety of operations such as bathtub filling operations or reheating operations, information indicating the amount of hot water remaining in the hot water storage tank 622, and the current temperature and amount of hot water in the bathtub 681. Additionally, the control unit 713 sends the device data 25a related to the hot water supply device 602 to an adapter 720. In one example, the control unit 713 sends, to the adapter 720, data indicating the content of a control command input into the hot water supply device 602 via the remote controllers 604 and 605. Moreover, the control unit 713 executes control commands sent from the adapter 720. The "control commands sent from the adapter 720" are, for example, operation commands for the hot water supply device 602 and/or commands ordering the sending of specific device data to the adapter 720. The storage unit 18 includes the possessed function information 18a, the cumulative operating time 18b, and the like. The cumulative operating time 18b is the cumulative operating time of the hot water supply device 602, as counted by the timer 17. The possessed function information 18a is information related to functions possessed by the hot water supply device 602. The possessed function information 18a is sent to the adapter 720 as a portion of the device data 25a, and is stored in the storage unit 24a of the adapter 720.

Additionally, the control unit 713 sends the temperature data 25b and hot water amount data 25c to the adapter 720. Specifically, the control unit 713 sends, to the adapter 720, temperature data detected by the temperature sensor 714 and hot water amount data detected by the water level sensor 715.

For the convenience of the user, the kitchen remote controller 604 is installed on a wall of the kitchen of the residence of the user. The kitchen remote controller 604 is used to remotely control the hot water supply device 602, and is connected to the control unit 713 of the hot water supply device 602. Examples of functions of the kitchen remote controller 604 include setting functions such as whether or not to supply hot water, whether or not to fill the bathtub, whether or not to reheat the water in the bathtub, the hot water supply temperature, and the hot water amount setting value; and guidance functions for notifying that the bathtub filling operation has completed, the reheating operation has completed, the amount of hot water in the hot water storage tank 622 has changed, and the like.

Similar to the kitchen remote controller 604, the bathroom remote controller 605 is used to remotely control the hot water supply device 602, and is installed on a wall in the bathroom of the residence. The bathroom remote controller 605 also has the setting functions and guidance functions described above.

(7-1-3) Adapter

In the hot water supply system 600, the adapter 720 is installed in an electrical component section 690. The adapter 720 is a network adapter for connecting the hot water supply device 602 to the LAN 81. The adapter 720 can be configured in the same manner as the adapters 20a and 20b described above. The adapter 720 has a control function for controlling the hot water supply device 602. The adapter 720 is connected by wire to the control unit 713 of the hot water supply device 602, and receives power from the hot water supply device 602 to operate (not illustrated in the drawings).

The device data 25a, the temperature data 25b, the hot water amount data 25c, and the like are stored in the storage unit 24a. As described above, these pieces of data 25a, 25b, and 25c are pieces of data related to the hot water supply device 602 that are sent from the hot water supply device 602 to the adapter 720. Moreover, the adapter 720 periodically (every one minute in this case) compiles these pieces of data 25a, 25b, and 25c as information of the hot water supply device 602 and sends the compiled information to the server 40 depicted in FIG. 17 via the public line 80.

A server address is stored in advance in the storage unit 24a. A device ID allocated to the adapter 720 by the server 40 is also stored in the storage unit 24a. The device ID, which is an identification code of the adapter 720, is information whereby the server 40 uniquely identifies the adapter 720.

As with the information mediation devices of the air conditioning system 100, the hot water supply system 600 is also provided with information mediation devices including the adapter 720, a router (not illustrated in the drawings), and the server 40. The information mediation devices of the hot water supply system 600 are also devices that use the public line 80 to exchange information between the hot water supply device 602 and the mobile terminal, namely the smartphone 500.

(7-1-4) Server

The storage unit 43 of the server 40 has a database for accumulating various data related to the hot water supply device 602. The hot water amount data 25c related to the hot water amount is stored in the adapter-specific database 43a of the storage unit 43 corresponding to the adapter 720.

(7-1-5) Smartphone

Figure 17:
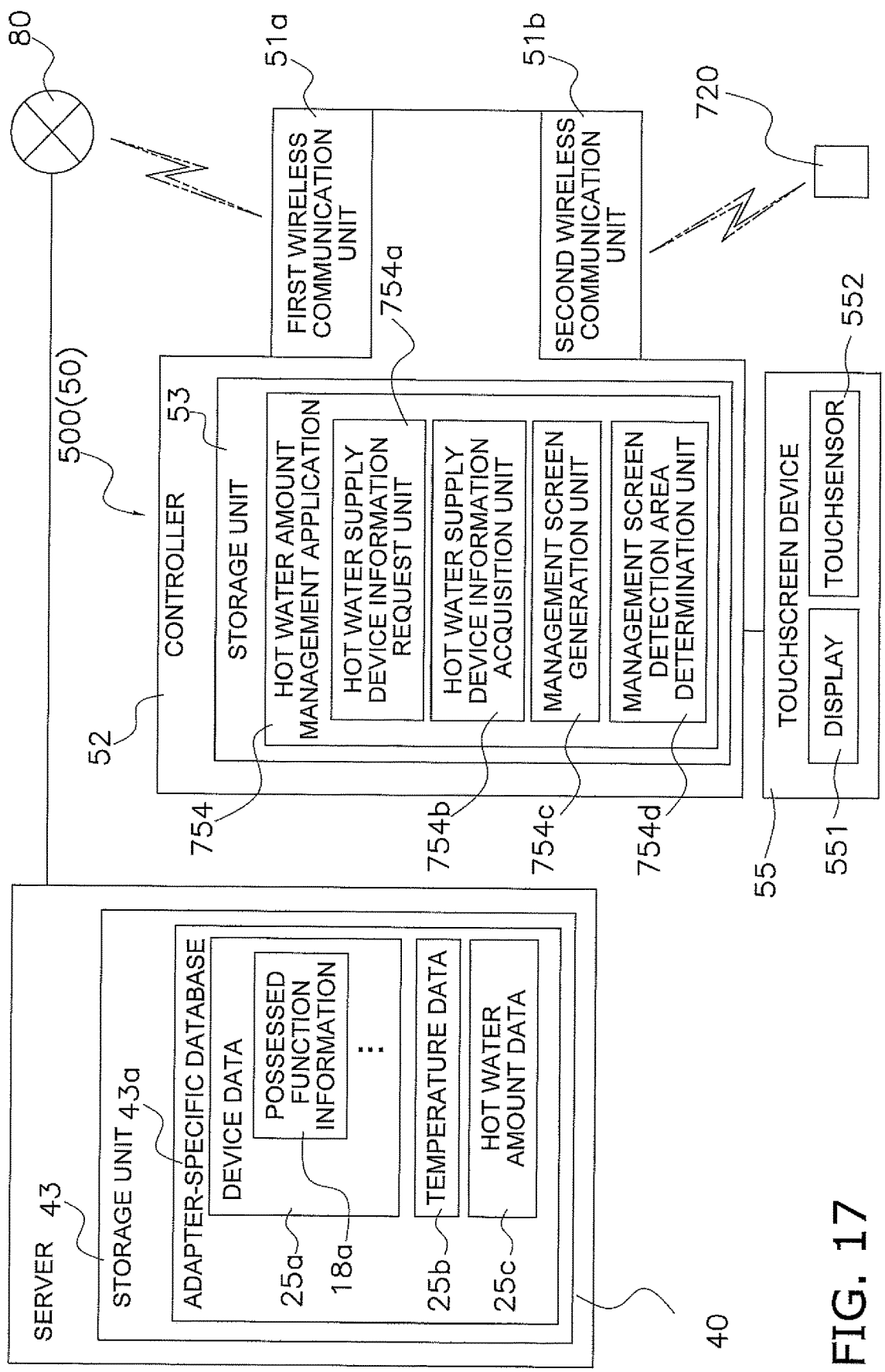
FIG. 17 is a block diagram that explains the configurations of a server and a controller of the smartphone.

As illustrated in FIG. 17, the configuration of the smartphone 500 is the same as in the air conditioning system 100. However, in this case, instead of the air conditioning management application 54, a hot water supply management application 754 for managing the hot water supply device 602 by the smartphone 500 is installed on the smartphone 500. The user downloads the hot water supply management application 754 from the server 40 via the public line 80. The user can monitor information of the hot water supply device 602 and operate the hot water supply device 602 via images generated and provided to the touchscreen device 55 by the hot water supply management application 754. The hot water supply management application 754 possesses the internet address of the server 40, which is the connection destination, from the beginning.

(7-1-6) Initial Settings

The hot water supply system 600 becomes usable by connecting the adapter 720 to the hot water supply device 602, causing the router 21 to recognize the adapter 720, the user downloading and installing the hot water supply management application 754 on the smartphone 500, and the user performing initial settings in the building 30, such as his own house. The initial settings of the hot water supply system 600 can be performed in the same manner as the air conditioning system 100 and, as such, a detailed description of the initial settings is omitted.

(7-1-7) Monitoring and Operating of Hot Water Supply Device Using Hot Water Supply Management Application The hot water supply management application 754 has a variety of functions and is provided with, as fundamental functional units, a hot water supply device information request unit 754a, a hot water supply device information acquisition unit 754b, a management screen generation unit 754c, and a management screen detection area determination unit 754d.

The data related to the hot water supply device 602 is received by the hot water supply device information acquisition unit 754b of the hot water supply management application 754 and is temporarily stored in the memory of the smartphone 500. The management screen generation unit 754c of the hot water supply management application 754 generates, on the basis of the possessed function information 18a and other data related to the hot water supply device 602, a hot water supply device management screen for monitoring and operating, which is displayed on the touchscreen device 55. Moreover, the management screen detection area determination unit 754d of the hot water supply management application 754 determines, on the basis of the possessed function information 18a and other data related to the hot water supply device 602, detection areas in which contact with the screen of the touchscreen device 55 is to be detected and which correspond to the hot water supply device management screen. When the hot water supply management application 754 of the smartphone 500 is started, the hot water supply device management screen for monitoring and operating of the hot water supply device 602 is displayed.

(7-1-8) Monitoring and Operating of Hot Water Supply Device Using Hot Water Supply Management Application When the hot water supply management application 754 on the smartphone 500 is started and the user inputs the login ID and the password, the hot water supply device information request unit 754a issues a request, via the second wireless communication unit 51b, to the adapter 720 for the information of the hot water supply device 602 connected to the adapter 720. Upon receipt of this information transmission request, the adapter 720 sends the variety of data related to the hot water supply device 602 stored in the storage unit 24a to the smartphone 500. This variety of data related to the hot water supply device 602 includes the device data 25a including the possessed function information 18a, the temperature data 25b such as the set temperature, the hot water amount data 25c, and the like. The subsequent generation and operation of the hot water supply device management screen are the same as the actions of the air conditioning management application 54 of the smartphone 500.

Figure 18:
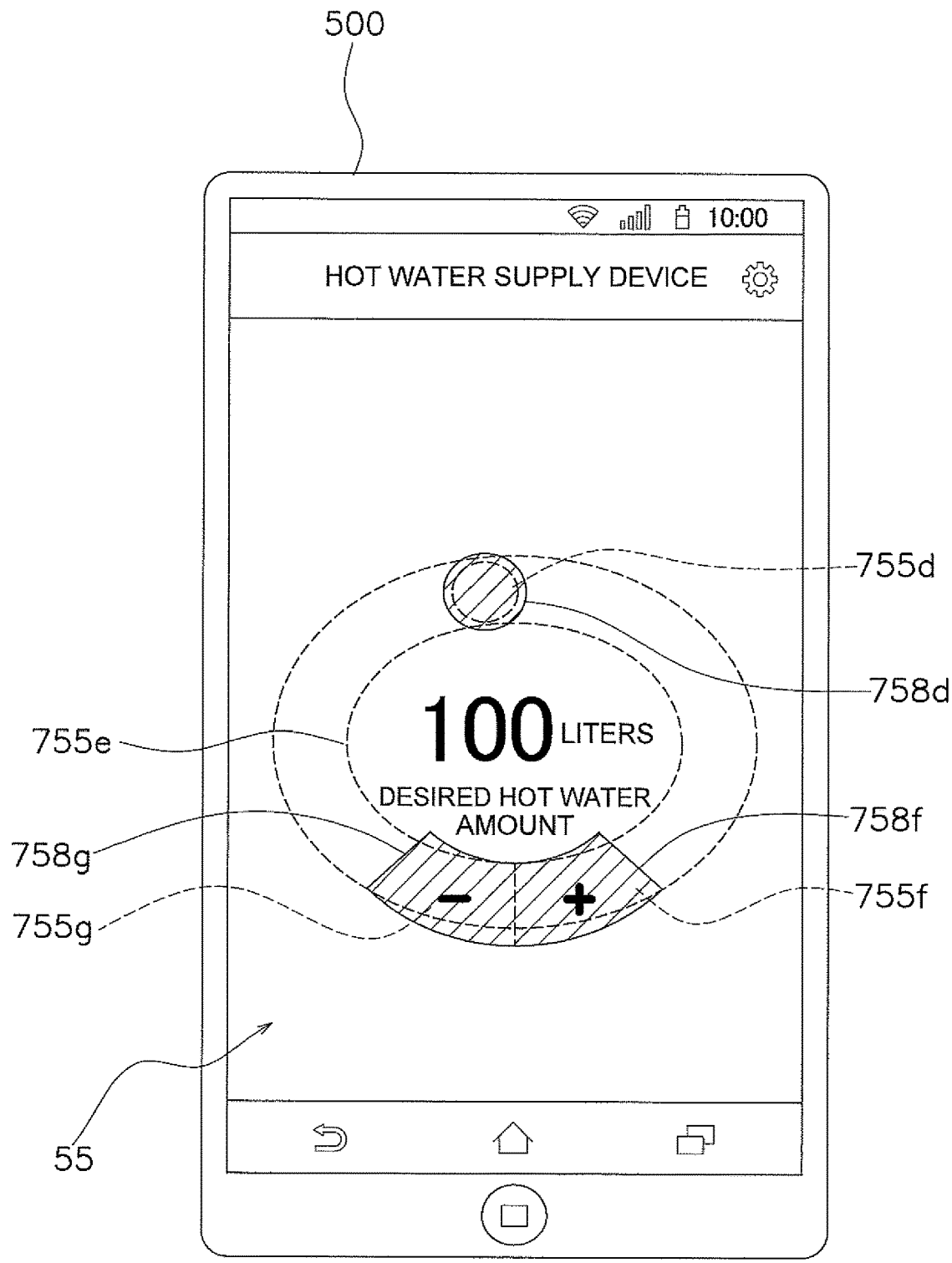
FIG. 18 is a drawing that explains a hot water supply device management screen for the hot water supply device.
Figure 19:
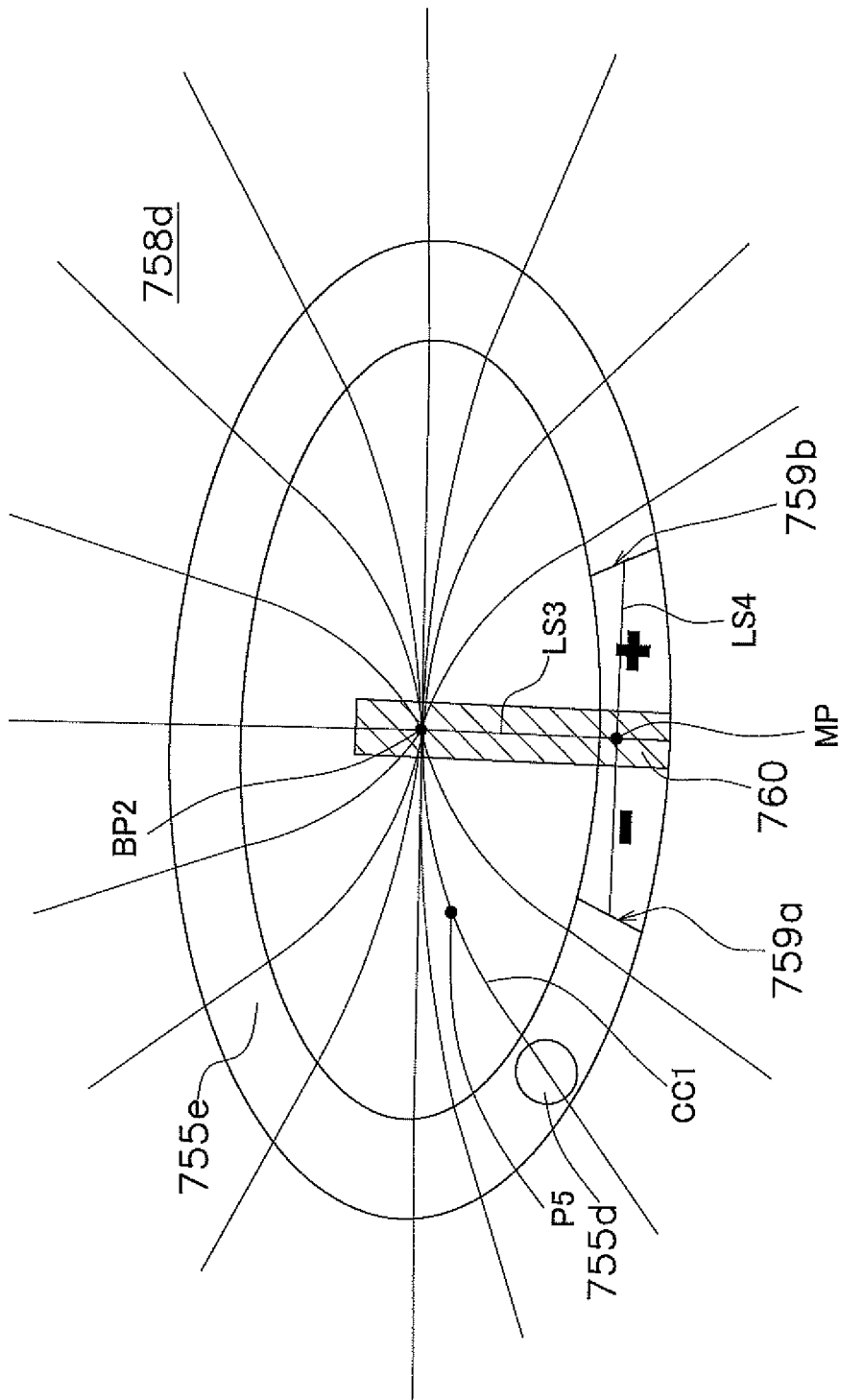
FIG. 19 is a drawing that explains the setting of a detection area on the hot water supply device management screen.

As illustrated in FIG. 18, the control unit 713 of the hot water supply device 602 uses the management screen generation unit 754c to cause the display 551 to display a plus button 755f for raising the hot water amount setting, a minus button 755g for lowering the hot water amount setting, a drag-type hot water amount setting button 755d capable of continuously changing the hot water amount setting, and an elliptical-shaped movement path 755e on which the hot water amount setting button 755d moves. Additionally, the management screen detection area determination unit 754d of the control unit 713 provides a reference point BP2 disposed at a location off the movement path 755e and a hot water amount change input detection area 758d for detecting a drag input on the hot water amount setting button 755d, which is a drag button. The reference point BP2 is provided at a midpoint of a line segment connecting the two center points of the elliptical arcs. The management screen detection area determination unit 754d of the controller 52 sets a cancel area 760 on a line segment LS3 connecting the reference point BP2 to a midpoint MP of a line segment LS4 connecting a one end 759a of the movement path 755e to the other end 759b of the movement path 755e. The cancel area 760 is elongated along the line segment LS3. The cancel area 760 is configured such that a length in a direction along the line segment LS3 is greater than a width in an extending direction of the line segment LS4. When the hot water amount setting button 755d is touch-operated, that is, when contact with the hot water amount change input detection area 758d is detected, the controller 52 expands the hot water amount change input detection area 758d as illustrated in FIG. 19. Note that, in FIG. 19, sections other than the cancel area 760 are the hot water amount change input detection area 758d. The controller 52 connects a drag operation position P5 to the reference point BP2 by a preset specific curve CC1 such as that illustrated in FIG. 19. Then, the controller 52 performs change processing to move the hot water amount setting button 755d to a crossing point where the specific curve CC1 crosses the movement path 755e, and change the hot water amount setting value to a value corresponding to the position of the hot water amount setting button 755d.

(7-2) Modification Example 1B

In the embodiment and modification example described above, an example was described of a case in which the smartphone 500 or similar mobile terminal 50 is the setting value change device. However, the setting value change device is not limited to mobile terminals and, for example, the present invention can be used in a configuration in which the remote controller 15, 604, and/or 605 is provided with a touchscreen device and the remote controller 15, 604, and/or 605 is used as the setting value change device.

(7-3) Modification Example 1C

In the embodiment or the modification examples described above, an example is described of a case in which the movement path 55e or 755e is circular arc-shaped or elliptical arc-shaped. However, the shape of the movement path is not limited to the shapes described in the embodiment or modification examples described above.

(7-4) Modification Example 1D

In the embodiment or the modification examples described above, an example is described of a case in which the refrigeration apparatuses are the air conditioners 10 and 10a, and the air conditioners 10 and 10a are also capable of heating. However, the present invention is not limited to use in heating apparatuses provided with refrigeration circuits for performing refrigeration cycles, and may also be used in heating apparatuses without refrigeration circuits. Examples of heating apparatuses without refrigeration circuits for performing refrigeration cycles include heating apparatuses that directly convert electricity and/or fuel to heat, and examples of such heating apparatuses that directly convert electricity and/or fuel to heat include central heating systems that use electricity and/or fuel to heat water and/or air, and circulate that heated water or air to heat a floor or wall.

(8) Features (8-1)

With the air conditioning system 100 described above, when there is a touch operation on the temperature setting button 55d, the controller 52 of the setting value change device, namely the smartphone 500 (or the mobile terminal 50) sets the temperature change input detection area 58d to be larger than the display range of the movement path 55e. The air conditioning system 100 includes the air conditioners 10a and 10b as the refrigeration apparatuses. With the hot water supply system 600 described above, when there is a touch operation on the hot water amount setting button 755d, the controller 52 of the smartphone 500 sets the hot water amount change input detection area 758d to be larger than the display range of the movement path 755e. The hot water supply system 600 includes the hot water supply device 602.

Moreover, when the smartphone 500 is running the air conditioning management application 54, the controller 52 performs change processing to move the temperature setting button 55d to the crossing point where the straight line SS1 or SS2 connecting the drag operation position P1 or P2 to the reference point BP1 or BP2 crosses the movement path 55e in the temperature change input detection area 58d, and change the temperature setting value to the value corresponding to the position of the temperature setting button 55d where the finger 200 was lifted. Alternatively, when the smartphone 500 is running the hot water supply management application 754, the controller 52 performs change processing to move the hot water amount setting button 755d to the crossing point where the specific curve CC1 connecting the drag operation position P4 to the reference point BP2 crosses the movement path 755e in the hot water amount change input detection area 758d, and change the hot water amount setting value to the value corresponding to the position of the hot water amount setting button 755d where the finger 200 was lifted.

As a result, even if the user performs rough operations and the drag operation position P1, P2, or P4 deviates from the movement path 55e or 755e, the drag operation will be continued and the temperature setting button 55d or the hot water amount setting button 755d can be moved along the movement path 55e or 755e. Thus, change operations to correct temperature setting values or correct hot water amount setting values by drag operations are made easier.

(8-2)

A configuration is described in which, when the temperature setting button 55d is being dragged, the temperature change input detection area 58d is expanded to the range where the operation buttons, namely the operation mode buttons 55c, the plus button 55f, the minus button 55g, and the like are displayed and, for example, even if there is a touch operation on the operation mode buttons 55c, the plus button 55f, or the minus button 55g, the change operation of the temperature setting value will be continued. As a result of this configuration, the temperature change input detection area 58d can be expanded even when setting, for example, the operation mode buttons 55c, the plus button 55f, and the minus button 55g, and erroneous inputs can be reduced because mode switching and the like will not occur even if the operation mode buttons 55c, the plus button 55f, or the minus button 55g is touch-operated during the drag operation of the temperature setting button 55d. As a result, drag operations are easier to perform and, also, correct change operations of temperature setting values are easier.

Likewise, a configuration is described in which, when the hot water amount setting button 755d is being dragged, the hot water amount change input detection area 758d is expanded to the range where the operation buttons, namely the plus button 755f, the minus button 755g, and the like are displayed and, for example, even if there is a touch operation on the plus button 755f or the minus button 755g, the change operation of the hot water amount setting value will be continued. As a result of this configuration, the hot water amount change input detection area 758d can be expanded even when setting, for example, the plus button 755f and the minus button 755g, and erroneous inputs can be reduced because changes of the hot water amount and the like will not occur even if the plus button 755f or the minus button 755g is touch-operated during the drag operation of the hot water amount setting button 755d. As a result, drag operations are easier to perform and, also, correct change operations of hot water amount setting values are easier.

(8-3)

As illustrated in FIG. 13C, a configuration is given in which, when there is contact with the cancel area 60 during drag operation of the temperature setting button 55d, the change processing of the temperature setting value is not continued and, at that point, the temperature setting is ended. As a result of this configuration, changes to unintended temperature setting values resulting from drag operations to points beyond the cancel area 60 (e.g. the drag operation position P4) are eliminated. In FIG. 13C, it is possible to reduce the chances that the temperature setting button 55d is moved to the position indicated by the dot-dot-dash line. Thus, the chances that temperature setting values are unintendedly changed are reduced and, as a result, the risk of causing a user discomfort can be mitigated. Additionally, wasted energy expenses can be decreased.

Likewise, a configuration is given in which, when there is contact with the cancel area 760 during drag operation of the hot water amount setting button 755d, the change processing of the hot water amount setting value is not continued and, at that point, the hot water amount setting is ended. As a result of this configuration, changes to unintended hot water amount setting values resulting from drag operations to points beyond the cancel area 760 are eliminated. Thus, the chances that hot water amount setting values are unintendedly changed are reduced and, as a result, wasted energy expenses can be decreased.

(8-4)

When the cancel area 60 or 760 is set to the range connecting the periphery of the one end, namely the one end 59a or 759a, of the movement path 55e or 755e to the periphery of the other end, namely the other end 59b or 759b, of the movement path 55e or 755e, a misoperations in which a value near the lower limit value is inputted due to the finger 200 moving to a location for inputting a value near the lower limit value can be reduced and, also, misoperations in which a value near the upper limit value is inputted due to the finger 200 moving to a location for inputting a value near the upper limit value can be reduced. As a result, it is possible to mitigate the risk of a significant difference occurring between the set temperature or hot water amount and the temperature or hot water amount intended to be set due to mistakenly inputting a value near the lower limit value instead of a value near the upper limit value of the temperature setting value or the hot water setting value, or mistakenly inputting a value near the upper limit value instead of a value near the lower limit value of the temperature setting value or the hot water amount value.

(8-5)

In cases where there is a significant difference between the desired temperature or the hot water amount and the actual set temperature or the hot water amount setting, there is a high probability of a drag operation being incorrectly performed on or in the vicinity of the straight line connecting the one end 59a or 759a of the movement path 55e or 755e to the other end 59b or 759b of the movement path 55e or 755e. As such, the cancel area 60 or 760 is provided so as to cross the straight line connecting the one end 59a or 759a to the other end 59b or 759b, and this configuration results in a high probability of reducing misoperations such as changing to a value near the lower limit value when intending to change to a value near the upper limit value and changing to a value near the upper limit value when intending to change to a value near the lower limit value.

(8-6)

When moving the temperature setting button 55d or the hot water amount setting button 755d along the circular arc-shaped or elliptical arc-shaped movement path 55e or 755e, there are cases where the drag operation is ended while moving the drag operation position toward the inside of the arc, as illustrated in FIG. 13C. In such cases, misoperations such as changing to a value near the lower limit value when intending to change to a value near the upper limit value and changing to a value near the upper limit value when intending to change to a value near the lower limit value can be reduced by the cancel area 60 or 760 that is disposed at the position inside the arc surrounded by the circular arc-shaped or elliptical arc-shaped movement path 55e or 755e. Thus, the feature for reducing significant differences from occurring between the set temperature or hot water amount and the temperature or hot water amount intended to be set is significantly enhanced.

(8-7)

The cancel area 60 or 760 is disposed in the range including the line segment LS1 or LS3 connecting the middle of the one end 59a or 759a of the movement path 55e or 755e to the other end 59b or 759b of the movement path 55e or 755e, namely the midpoint MP to the reference point BP1 or BP2. As a result, drag inputs resulting from a drag operation traversing the line segment LS1 or LS3 can be reduced, and misoperations such as changing to a value near the lower limit value when intending to change to a value near the upper limit value and changing to value near the upper limit value when intending to change to a value near the lower limit value can be reduced by the cancel area 60 or 760 that is disposed on the line segment LS1 or LS3. Thus, the feature for reducing a significant temperature difference from occurring between the set temperature and the temperature intended to be set is significantly enhanced.

(8-8)

The shape of the cancel area 60 or 760 is set such that the length in the direction along the line segment LS1 or LS3 is longer than the length in the direction connecting the one end 59a or 759a to the other end 59b or 759b. As such, it is possible to reduce misoperations in which, during a drag operation, the cancel area 60 or 760 is unintentionally touched when intending to set to a value near the lower limit value or to a value near the upper limit value. As a result, it is possible to reduce misoperations such as an unintentional input of a value near the upper limit value and an unintentional input of a value near the lower limit value. For example, if the cancel area 60 or 760 has a shape in which the length in the direction along the line segment LS1 or LS3 is equal to the length in the direction connecting the one end 59a or 759a to the other end 59b or 759b, if a swipe operation is performed even slightly deviating from the movement path 55e or 755e, the cancel area will be touched and the drag operation will be ended.

(8-9)

After the drag operation of the temperature setting button 55d or the hot water amount setting button 755d has started, the temperature change input detection area 58d or the hot water amount change input detection area 758d is expanded to set the drag area larger than the display range of the movement path. As such, it is possible to dispose the operation buttons such as the plus button 55f or 755f and the minus button 55g or 755g in the temperature change input detection area 58d or the hot water amount change input detection area 758d of the expanded portion before and after the performance of the drag operation, thereby making the performance of operations other than drag operations easier. As a result, the overall operability of the touchscreen device 55 can be enhanced.

REFERENCE SIGNS LIST 10a, 10b Air conditioner (example of refrigeration apparatus)

50 Mobile terminal (example of setting value change device)
52 Controller
55 Touchscreen device
60 Cancel area
100 Air conditioning system
500 Smartphone (example of setting value change device)
551 Display
552 Touch sensor
600 Hot water supply system
602 Hot water supply device

CITATION LIST

Patent Literature

Patent Document 1: Japanese Unexamined Patent Application Publication No. 2015-114057
Patent Document 2: Japanese Unexamined Patent Application Publication (Translation of PCT Application) No. 2015-513747

The invention claimed is:

1. A setting value change device that performs change processing to change a temperature setting value of a refrigeration apparatus and/or a heating apparatus, the setting value change device comprising:
a touchscreen device including a display that displays the temperature setting value, the touchscreen device detecting a touch operation on the display; and
a processor connected to the touchscreen device, wherein:
the processor causes the display to display a drag button and an arcuate movement path on which the drag button moves,
the processor provides, on the touchscreen device, a drag area that detects a drag operation performed by a finger on the drag button, and a reference point disposed at a location off the arcuate movement path, wherein the location of the reference point is fixed such that the location of the reference point on the touchscreen device does not change as different drag operations are performed on the drag button,
the processor sets the drag area larger than a display range of the arcuate movement path, and
when the finger performs the drag operation, which is initiated by touching the drag button, and instead of sliding along the arcuate movement path, the finger moves along a different path stopping at a drag operation position deviating from the arcuate movement path, the processor:
connects the drag operation position to the reference point using a straight line or specific curve,
determines a crossing point where the straight line or specific curve connecting the reference point and the drag operation position crosses the arcuate movement path,
moves the drag button to the crossing point, thereby causing the drag button to be set a distance away from the drag operation position, and
changes the temperature setting value to a value corresponding to a position of the moved drag button on the arcuate movement path.

2. The setting value change device according to claim 1, wherein
the processor:
causes the display to display an operation button near the arcuate movement path, and performs settings to enable the touchscreen device to detect and input a touch operation on the operation button; and
when the drag button is being dragged, expands the drag area up to a range in which the operation button is displayed so that a change operation of the temperature setting value is continued even if there is a touch operation on the operation button.

3. The setting value change device according to claim 2, wherein
the processor sets a cancel area such that when the cancel area is touched at a time of the drag operation of the drag button, the controller does not continue changing the temperature setting value.

4. The setting value change device according to claim 2, wherein the processor:
prior to the drag button being touched, sets the drag area to a range smaller than the display range of the arcuate movement path including a display range of the drag button, and
after a drag operation of the drag button has started, expands the drag area to set the drag area larger than the display range of the arcuate movement path.

5. The setting value change device according to claim 1, wherein
the processor sets a cancel area such that when the cancel area is touched at a time of the drag operation of the drag button, the processor does not continue changing of the temperature setting value.

6. The setting value change device according to claim 5, wherein the processor:
prior to the drag button being touched, sets the drag area to a range smaller than the display range of the arcuate movement path including a display range of the drag button, and
after a drag operation of the drag button has started, expands the drag area to set the drag area larger than the display range of the arcuate movement path.

7. The setting value change device according to claim 1, wherein the processor:
prior to the drag button being touched, sets the drag area to a range smaller than the display range of the arcuate movement path including a display range of the drag button, and
after a drag operation of the drag button has started, expands the drag area to set the drag area larger than the display range of the arcuate movement path.

8. A setting value change device that performs change processing to change a temperature setting value of a refrigeration apparatus and/or a heating apparatus, the setting value change device comprising:
a touchscreen device including a display that displays the temperature setting value, the touchscreen device detecting a touch operation on the display; and
a processor connected to the touchscreen device, wherein the processor:
causes the display to display a drag button and a movement path on which the drag button moves in correspondence with a change in the temperature setting value,
provides, on the touchscreen device, a drag area that detects a drag input on the drag button and a reference point disposed at a location off the movement path,
sets the drag area larger than a display range of the movement path,
moves the drag button to a crossing point where a straight line or a specific curve connecting the reference point to a drag operation position in the drag area crosses the movement path, and changes the temperature setting value to a value corresponding to a position of the drag button, wherein the processor further:
sets a cancel area such that when the cancel area is touched at a time of the drag operation of the drag button, the processor does not continue changing of the temperature setting value causes the display to display the movement path as a non-linear shape, associates a value from when a position of the drag button is at a one end of the movement path with a lower limit value of the temperature setting value, associates a value from when the position of the drag button is at the other end of the movement path with an upper limit value of the temperature setting value, and sets the cancel area to a range connecting a periphery of the one end of the movement path to a periphery of the other end of the movement path.

9. The setting value change device according to claim 8, wherein the processor disposes the cancel area so as to cross a straight line connecting the one end of the movement path to the other end of the movement path.

10. The setting value change device according to claim 9, wherein the processor:

causes the display to display the movement path as a circular arc shape or an elliptical arc shape, and disposes the cancel area at a position surrounded by the movement path.

11. The setting value change device according to claim 9, wherein the processor disposes the cancel area in a range including a line segment connecting a middle between the one end of the movement path and the other end of the movement path to the reference point.

12. The setting value change device according to claim 9, wherein the processor:

prior to the drag button being touched, sets the drag area to a range smaller than the display range of the movement path including a display range of the drag button, and after a drag operation of the drag button has started, expands the drag area to set the drag area larger than the display range of the movement path.

13. The setting value change device according to claim 8, wherein the processor:

causes the display to display the movement path as a circular arc shape or an elliptical arc shape, and disposes the cancel area at a position surrounded by the movement path.

14. The setting value change device according to claim 13, wherein the processor disposes the cancel area in a range including a line segment connecting a middle between the one end of the movement path and the other end of the movement path to the reference point.

15. The setting value change device according to claim 13, wherein the processor:

prior to the drag button being touched, sets the drag area to a range smaller than the display range of the movement path including a display range of the drag button, and after a drag operation of the drag button has started, expands the drag area to set the drag area larger than the display range of the movement path.

16. The setting value change device according to claim 8, wherein the processor disposes the cancel area in a range including a line segment connecting a middle between the one end of the movement path and the other end of the movement path to the reference point.

17. The setting value change device according to claim 16, wherein the processor sets a shape of the cancel area such that a length in a direction along the line segment is longer than a length in a direction connecting the one end to the other end.

18. The setting value change device according to claim 16, wherein the processor:

prior to the drag button being touched, sets the drag area to a range smaller than the display range of the movement path including a display range of the drag button, and after a drag operation of the drag button has started, expands the drag area to set the drag area larger than the display range of the movement path.

19. The setting value change device according to claim 8, wherein the processor:

prior to the drag button being touched, sets the drag area to a range smaller than the display range of the movement path including a display range of the drag button, and after a drag operation of the drag button has started, expands the drag area to set the drag area larger than the display range of the movement path.

20. A setting value change device that performs change processing to change a hot water amount setting value of a hot water supply device, the setting value change device comprising:

a touchscreen device including a display that displays the hot water amount setting value, the touchscreen device detecting a touch operation on the display; and a processor connected to the display and the touchscreen device, wherein:

the processor causes the display to display a drag button and an arcuate movement path on which the drag button moves, the processor provides a drag area that detects a drag operation performed by a finger on the drag button, and a reference point disposed at a location off the arcuate movement path, wherein the location of the reference point is fixed such that the location of the reference point on the touchscreen device does not change as different drag operations are performed on the drag button, the processor sets the drag area larger than a display range of the arcuate movement path, and when the finger performs the drag operation, which is initiated by touching the drag button, and instead of sliding along the arcuate movement path, the finger moves along a different path stopping at a drag operation position deviating from the arcuate movement path, the processor:

connects the drag operation to the reference point using a straight line or specific curve, determines a crossing point where the straight line or specific curve connecting the reference point and the drag operation position crosses the arcuate movement path, moves the drag button to the crossing point, thereby causing the drag button to be set a distance away from the drag operation position, and changes the hot water amount setting value to a value corresponding to a position of the moved drag button on the arcuate movement path.

\* \* \* \* \*